United States Patent
Huang et al.

(10) Patent No.: US 12,479,809 B2
(45) Date of Patent: Nov. 25, 2025

(54) HYDRAZONE AMIDE DERIVATIVE AND APPLICATION THEREOF IN PREPARATION OF MEDICAMENTS FOR PREVENTING AND TREATING ALOPECIA

(71) Applicant: SHENZHEN CELL INSPIRE PHARMACEUTICAL DEVELOPMENT CO., LTD., Guangdong (CN)

(72) Inventors: Dane Huang, Guangdong (CN); Chao Zhao, Guangdong (CN); Qiong Gu, Guangdong (CN); Jun Xu, Guangdong (CN)

(73) Assignee: SHENZHEN CELL INSPIRE PHARMACEUTICAL DEVELOPMENT CO., LTD., Guangdong (CN)

( * ) Notice: Subject to any disclaimer, the term of this patent is extended or adjusted under 35 U.S.C. 154(b) by 814 days.

(21) Appl. No.: 17/562,976

(22) Filed: Dec. 27, 2021

(65) Prior Publication Data

US 2022/0153713 A1   May 19, 2022

Related U.S. Application Data

(63) Continuation of application No. PCT/CN2020/083076, filed on Apr. 2, 2020.

(30) Foreign Application Priority Data

Jun. 28, 2019 (CN) .................... 201910578833.9

(51) Int. Cl.
| | |
|---|---|
| C07D 277/56 | (2006.01) |
| A61P 17/14 | (2006.01) |
| C07C 251/76 | (2006.01) |
| C07D 211/58 | (2006.01) |
| C07D 213/75 | (2006.01) |
| C07D 213/85 | (2006.01) |
| C07D 217/06 | (2006.01) |
| C07D 277/82 | (2006.01) |
| C07D 295/185 | (2006.01) |

(52) U.S. Cl.
CPC ............ *C07D 277/56* (2013.01); *A61P 17/14* (2018.01); *C07C 251/76* (2013.01); *C07D 211/58* (2013.01); *C07D 213/75* (2013.01); *C07D 213/85* (2013.01); *C07D 217/06* (2013.01); *C07D 277/82* (2013.01); *C07D 295/185* (2013.01)

(58) Field of Classification Search
None
See application file for complete search history.

(56) References Cited

U.S. PATENT DOCUMENTS 4,139,619 A    2/1979    Chidsey, III

FOREIGN PATENT DOCUMENTS

| CN | 1084512 A | 3/1994 |
| CN | 1132510 A | 10/1996 |
| CN | 1671695 A | 9/2005 |
| CN | 110229118 A | 9/2019 |
| CN | 110330465 A | 10/2019 |
| JP | H09278757 A | 10/1997 |
| JP | 2013182058 A | 9/2013 |
| JP | 2016138093 A | 8/2016 |
| JP | 2022540063 A | 9/2022 |
| WO | 2009137471 A2 | 11/2009 |

OTHER PUBLICATIONS

Notice of Reasons for Refusal in Japanese Patent Application No. 2021-577958, dated Aug. 29, 2023.
First Office Action in counterpart China Application No. 202110235586.X, dated May 20, 2022.
The extended European search report in European Patent Application No. 20832461.6, dated Jul. 20, 2022.
Viswanathan Anisha et al., "2-(2-(2,4-dioxopentan-3-ylidene)hydrazineyl)benzonitrile as novel inhibitor of receptor tyrosine kinase and PI3K/AKT/mTOR signaling pathway in glioblastoma", European Journal of Medicinal Chemistry, vol. 166, Jan. 22, 2019, pp. 291-303, ISSN: 0223-5234, DOI: 10.1016/J.EJMECH.2019.01.021.
Database Registry [Online] , Apr. 20, 2001, Anonymous, "5-Thiazolecarboxylic acid, 2-[[2-[2-(2-carboxyphenyl)hydrazinylidene]-1,3-dioxobutyl ]amino]-4-methyl-, 5-ethyl ester (CA Index Name) Other CA Index Names", retrieved from STN, Database accession No. 331968-10-6.

(Continued)

*Primary Examiner* — Adam C Milligan
*Assistant Examiner* — Karen Cheng

(57) ABSTRACT

The present disclosure provides a brand-new hydrazone amide derivative and an application thereof in preparation of medicaments for preventing and treating alopecia. The structural formula of the hydrazone amide derivative is shown in formula (I), and the hydrazone amide derivative is a brand-new compound for stimulating hair follicle growth and preventing and treating alopecia.

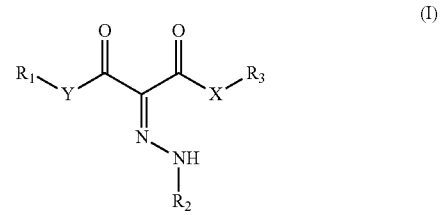

4 Claims, 1 Drawing Sheet

(56) References Cited

OTHER PUBLICATIONS

Database Registry [Online], Apr. 16, 2001, Anonymous, "5-Thiazolecarboxylic acid, 4-methyl-2-[[2-[2-(3-nitrophenyl)hydrazinylidene]-1,3-dioxobutyl]amino]-, ethyl ester (CA Index Name)", retrieved from STN, Database accession No. 331416-65-0.

Database Registry [Online], Jan. 18, 2001, Anonymous, "5-Thiazolecarboxylic acid, 4-methyl-2-[[2-[2-(2-methylphenyl)hydrazinylidene]-1,3-dioxobutyl]amino]-, ethyl ester (CA Index Name)", retrieved from STN, Database accession No. 314763-74-1.

M.A. Zayed et al., "The Use of Thermal and Spectrometric Analyses for the Structure Investigation of Arylhydrazoneacetoacetylaminopyridines and Their Copper Chelates", Thermochimica Acta, vol. 146, Jan. 1, 1989, pp. 1-13, Retrieved from the Internet: URL:https://www.sciencedirect.com/science/article/pii/0040603189870716 [retrieved on Feb. 8, 2021].

Rajeev Jain et al., "Synthesis of some New 1-H-(4,6-Dimethylpyrimidinyl)-3-arylamino-3-arylazo-5-methylpyrazoles as Possible Potential Antineoplastics", Journal of the Indian Chemical Society, vol. 65, Jan. 1, 1988, p. 354, ISSN: 0019-4522.

Xuehua Zheng et al., "Screening, synthesis, crystal structure, and molecular basis of 6-amino-4-phenyl-1,4-dihydropyrano[2,3-c]pyrazole-5-carbonitriles as novel AKR1C3 inhibitors", Bioorganic & Medicinal Chemistry, vol. 26, Nov. 3, 2018, pp. 5934-5943.

Notice of Decision of Granting Patent Right for Invention in counterpart China Application No. 202110235586.X, dated Feb. 15, 2023.

Notice of Reasons for Refusal in Japanese Patent Application No. 2021-577958, dated Jan. 31, 2023.

Antonius Kettrup et al., "The Fragmentation of Azo and Hydrazone Tautomeres of 2,3-Dioxobutyranilide-2-phenylhydrazones in the Gaseous State in Dependence of Substituents", Zeitschrift fur Naturforschung B, 1977, vol. 32, No. 8, pp. 863-868, DOI: 10.1515/znb-1977-0806.

Communication pursuant to Article 94(3) EPC in European Patent Application No. 20 832 461.6, dated Apr. 14, 2023.

"RN331968-10-6". CAS Registry, STN accession, Apr. 20, 2001.

Zheng, X. H. et al., "Screening, Synthesis, Crystal Structure, and Molecular Basis of 6-Amino-4-Phenyl-1,4-Dihydropyrano[2,3-c]Pyrazole-5-Carbonitriles as Novel AKR1C3 Inhibitors", Bioorganic & Medicinal Chemistry, vol. 26, No. 22, Nov. 3, 2018, ISSN: 0968-0896, p. 5937, table 1.

Lycka, A. et al., "27AI, 15N, 13C and 1H NMR Spectra and Negative-Ion Electrospray Mass Spectra of the 2:1 Aluminium(III) Complexes of Azo Dyes Derived from Anthranilic Acid", Dyes and Pigments, vol. 50, No. 3, Sep. 30, 2001, ISSN: 0143-7208, pp. 203-209, Scheme 2.

Gurbanov, A. V. et al., "The Henry Reaction Catalyzed by NiII and CuII Complexes Bearing Arylhydrazones of Acetoacetanilide", Journal of Organometallic Chemistry, vol. 869, May 31, 2018, ISSN: 0022-328X, pp. 48-53, Scheme 2, DOI: 10.1016/j.jorganchem.2018.05.025.

Ma, Zhen et al., "Effective Cyanosilylation of Aldehydes with Copper(II)-Based Polymeric Catalysts", Journal of Molecular Catalysis A: Chemical, vol. 428, Nov. 28, 2016, ISSN: 1381-1169, pp. 17-23, Scheme 2, DOI: http://dx.doi.org/doi:10.1016/j.molcata.2016.11.036.

"RN63239-81-6", CAS Registry, STN accession, Nov. 16, 1984.

"RN63239-82-7", CAS Registry, STN accession, Nov. 16, 1984.

Fouda, A. S. et al., "Inhibition of the Acid Corrosion of Iron with 2-(Acetoacetamido)Pyridine Aryl Hydrazone Derivatives", Bulletin of Electrochemistry, vol. 17, No. 7, Jul. 31, 2001, ISSN: 0256-1654, pp. 303-310, figure 5.

Aboutabl, M. A. et al., "Polarographic Behaviour of α-and γ-Substituted Acetoacetanilide Derivatives in Alcoholic Aqueous Media", Monatshefte für Chemie, vol. 123, Mar. 31, 1992, ISSN: 0026-9247, pp. 217-223, structural formula and table 1.

Kheder, N. A. et al., "Facile and Convenient Synthesis of Pyrazole, Pyridine, Pyridazine, Pyrazolo[3,4-b]Pyridine, and Pyrazolo[5,1-c][1,2,4]Triazine Derivatives", Synthetic Communications, vol. 38, No. 18, Sep. 9, 2008, ISSN: 1532-2432, pp. 3170-3182, Scheme 4, DOI: 10.1080/00397910802109257.

Abd El-Badih A. G. Ghattas et al., "New heterocyclic compounds derived from 4,6-diamino-3-cyano-2-methylthiopyridine and their Biological Activity", Journal of Heterocyclic Chemistry, 2016, pp. 879-888, DOI 10.1002/jhet.2649.

CAS registry on STN CAS-RN: 331968-10-6 (Apr. 20, 2001); 63239-82-7 (Nov. 16, 1984); 63239-81-6 (Nov. 16, 1984).

HYDRAZONE AMIDE DERIVATIVE AND APPLICATION THEREOF IN PREPARATION OF MEDICAMENTS FOR PREVENTING AND TREATING ALOPECIA

CROSS-REFERENCE TO RELATED APPLICATION

The present application is a continuation of International Patent Application No. PCT/CN2020/083076, filed on Apr. 2, 2020, which claims priority to Chinese patent application NO. 201910578833.9, filed on Jun. 28, 2019, the entire content of which is incorporated herein by reference.

TECHNICAL FIELD

The present disclosure relates to the field of biomedicine, in particular to a hydrazone amide derivative and use thereof as a hair follicle growth stimulator in preparation of medicaments for preventing and treating alopecia.

BACKGROUND

Alopecia is a skin disease characterized by hair loss. There are many kinds of alopecia, including alopecia areata, pseudo-alopecia areata, papular alopecia, alopecia totalis, alopecia caused by mental factors, alopecia caused by lack of nutrients, seborrheic alopecia, alopecia caused by drug chemotherapy, androgenetic alopecia, etc. Human hair not only has biological and physiological functions, but also plays an important role in psychology and sociology because hair thickness and hairstyle have obvious influence on human appearance. At present, with the improvement of living standards, people have increasingly demands for beauty. Hair loss affects the appearance and negatively affects the patient's psychology, thus reducing the patient's quality of life.

It can be seen from various kinds of hair loss that many reasons cause hair loss, but the reasons for most hair loss are still unclear, which brings great difficulties to treatment. At present, the most effective methods for treating androgenetic alopecia are topical administration of minoxidil lotion and oral administration of finasteride (Chen Shuxin, Li Jiehua, Mo Yufang, *Clinical observation on the clinical efficacy of minoxidil lotion combined with finasteride in treatment of androgenetic alopecia*, International Medicine & Health Guidance News, 2006, 12(6):64-65.). According to experimental research, adding minoxidil (minuodier) can increase the growth time of cultured hair follicles in vitro. Minoxidil stimulates and maintains hair follicle growth, prolongs hair follicle growth period, enables tiny hair follicle to grow big and promotes hair papilla angiogenesis, thus playing an important role in the treatment of alopecia. Finasteride is a 4-azasteroid compound and is a specific inhibitor of intracellular enzyme type II 5α-reductase in the process of testosterone metabolism into stronger 5α-dihydrotestosterone. However, it has been proved that minoxidil and finasteride have significant defects so far. Local administration of minoxidil can cause side effects to some extent, such as rash, local inflammation, headache, hirsutism, etc., while oral administration of finasteride has been determined to produce hormone dysfunction that has potential negative effects on sexual life and have genetic and reproductive toxicity.

Therefore, it is of great significance to develop new drugs for preventing and treating alopecia with small side effects.

SUMMARY

The inventor found that the drugs for treating osteoporosis have the function of treating alopecia. Based on this, the inventor of this application made further research on the basis of a new type of compound with anti-osteoporosis function discovered in the self-owned laboratory, and surprisingly found that this new type of compound with anti-osteoporosis function is still superior in stimulating hair follicle growth and preventing and treating alopecia, and has the advantage of less toxic and side effects, and has a wide market application prospect.

In a first aspect of the present disclosure, the present disclosure provides a compound of Formula (I), or a stereoisomer, a geometric isomer, a tautomer, a nitrogen oxide, a hydrate, a solvate, a metabolite, a pharmaceutically acceptable salt or a prodrug of the compound of Formula (I),

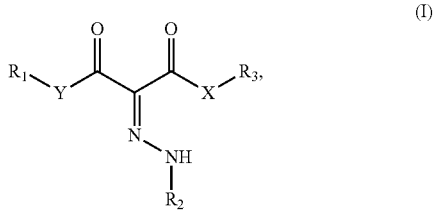

in which:
X and Y are each independently selected from $C_1$-$C_6$ alkyl, hydroxyl, sulfhydryl, amino, nitro or cyano, wherein the $C_1$-$C_6$ alkyl, the hydroxyl, the sulfhydryl and the amino are independently substituted with $R_1$ or $R_3$; $R_1$ and $R_3$ are independently hydrogen, cyano, nitro, alkoxy, alkylamino, hydroxyl, amino, fluorine, chlorine, bromine, linear alkyl, cycloalkyl, alkenyl, a five- to ten-membered heterocyclic ring, a five- to ten-membered aromatic heterocyclic ring, or a benzene ring, or $R_1$ together with Y or $R_3$ together with X forms a five- to ten-membered heterocyclic ring or a five- to ten-membered aromatic heterocyclic ring, wherein the linear alkyl, the cycloalkyl, the alkenyl, the five- to ten-membered heterocyclic ring, the five- to ten-membered aromatic heterocyclic ring and the benzene ring are independently and optionally substituted with R', $R_2$ is cyano, nitro, alkoxy, alkylamino, cycloalkyl, linear alkyl, alkenyl, a five- to six-membered ring, a five- to six-membered aromatic heterocyclic ring, or a benzene ring, wherein the linear alkyl, the cycloalkyl, the alkenyl, the five- to six-membered ring, the five- to six-membered aromatic heterocyclic ring and the benzene ring are independently and optionally substituted with R', R' is hydrogen, halogen, $C_1$-$C_5$ alkoxy, $C_1$-$C_5$ alkyl, an ester group, nitro, hydroxyl, sulfhydryl, carboxyl, amino, cyano, alkynyl, or trifluoromethyl.

According to an embodiment of the present disclosure, X is an oxygen atom or an amine group; and Y is $C_1$-$C_4$ alkylene, an oxygen atom, or an amine group.

According to an embodiment of the present disclosure, $R_1$ is hydrogen or $C_1$-$C_3$ linear alkyl.

According to an embodiment of the present disclosure, $R_1$ is hydrogen or $C_1$-$C_3$ linear alkyl.

According to an embodiment of the present disclosure, $R_2$ is phenyl, 2-carboxyphenyl, 3-carboxyphenyl, 4-carboxyphenyl, 2-hydroxyphenyl, 2-methoxyphenyl, 2-methylhydroxyphenyl, 2-aminophenyl, 2-amidophenyl, 2-carbomethoxyphenyl, 2-nitrophenyl, 2-cyanophenyl, 2,3-dicarboxyphenyl, 2,4-dicarboxyphenyl, 2,6-dicarboxyphenyl, 2,5-dicarboxyphenyl, 2-carboxy- 3methylphenyl, 2-carboxy-4-methylphenyl, 2-carboxy-5-methylphenyl, 2-carboxy-6-methylphenyl, 2-carboxy-3-fluorophenyl, 2-carboxy-4-fluorophenyl, 2-carboxy-5-fluorophenyl, 2-carboxy-6-fluorophenyl, 2-carboxy-3-hydroxyphenyl, 2-carboxy-4-hydroxyphenyl, 2-carboxy-5-hydroxyphenyl, 2-carboxy-6-hydroxyphenyl, 2-carboxy-3-aminophenyl, 2-carboxy-4-aminophenyl, 2-carboxy-5-aminophenyl, 2-carboxy-6-aminophenyl, 2-carboxy-6-trifluoromethylphenyl, 2-carboxy-3-trifluoromethylphenyl, 2-carboxy-4-trifluoromethylphenyl, 2-carboxy-5-trifluoromethylphenyl, 2-carboxy-6-methoxyphenyl, 2-carboxy-3-methoxyphenyl, 2-carboxy-4-methoxyphenyl, 2-carboxy-5-methoxyphenyl, 2-carboxy-3-chlorophenyl, 2-carboxy-4-chlorophenyl, 2-carboxy-5-chlorophenyl, 2-carboxy-6-chlorophenyl, 2-carboxy-3-cyanophenyl, 2-carboxy-4-cyanophenyl, 2-carboxy-5-cyanophenyl, 2-carboxy-6-cyanophenyl, 2-carboxy-3-nitrophenyl, 2-carboxy-4-nitrophenyl, 2-carboxy-5-nitrophenyl, or 2-carboxy-6-nitrophenyl.

According to an embodiment of the present disclosure, $R_3$ is thiazolyl, 4-methylthiazolyl, 4-methyl-5-ethoxycarbonylthiazolyl, 4-methyl-5-carbomethoxythiazolyl, 4-methyl-5-carboxythiazolyl, 4-methyl-5-formylmorpholinylthiazolyl, 4-phenylthiazolyl, thienyl, imidazolyl, pyridinyl, 6-carbomethoxypyridinyl, morpholinyl, 2-methylpyridinyl, 3-methylpyridinyl, 4-methylpyridinyl, 5-methylpyridinyl, 6-methylpyridinyl, 2-cyanopyridinyl, 3-cyanopyridinyl, 4-cyanopyridinyl, 5-cyanopyridinyl, 6-cyanopyridinyl, 2-nitropyridinyl, 3-nitropyridinyl, 4-nitropyridinyl, 5-nitropyridinyl, 6-nitropyridinyl, 2-hydroxypyridinyl, 3-hydroxypyridinyl, 4-hydroxypyridinyl, 5-hydroxypyridinyl, 6-hydroxypyridinyl, 2-methoxypyridinyl, 3-methoxypyridinyl, 4-methoxypyridinyl, 5-methoxypyridinyl, 6-methoxypyridinyl, 4-hydroisoquinolyl, phenyl, or benzothiazolyl.

According to an embodiment of the present disclosure, $R_1$ is hydrogen or $C_1$-$C_4$ alkyl; $R_2$ is a benzene ring, a pyridine ring, a pyrimidine ring, or a pyrazine ring; and $R_3$ is a five- to six-membered heterocyclic ring containing N or O, a five-membered heteroaromatic ring containing N, O or S, a six-membered heteroaromatic ring containing one or two nitrogen atoms, a benzene ring,

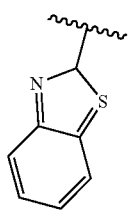

or $R_3$ together with X forms a five- to ten-membered heterocyclic ring containing an N atom or an O atom.

According to an embodiment of the present disclosure, $R_1$ is hydrogen; $R_2$ is a benzene ring; $R_3$ is a pyridine ring, a pyrimidine ring, a pyrazine ring,

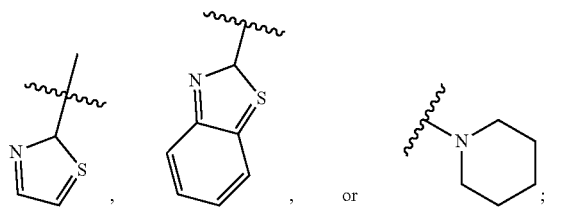

or $R_3$ together with X forms

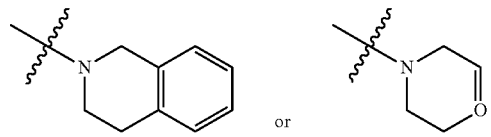

According to an embodiment of the present disclosure, the compound does not comprise a compound represented by formula (1):

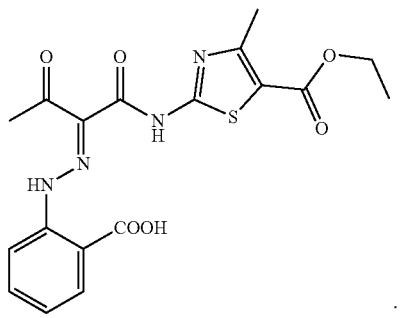

According to an embodiment of the present disclosure, it is a compound having one of the following structures, or a stereoisomer, geometric isomer, tautomer, nitrogen oxide, hydrate, solvate, metabolite, pharmaceutically acceptable salt or prodrug of the compound having one of the following structures:

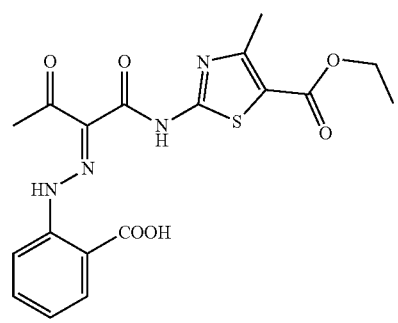

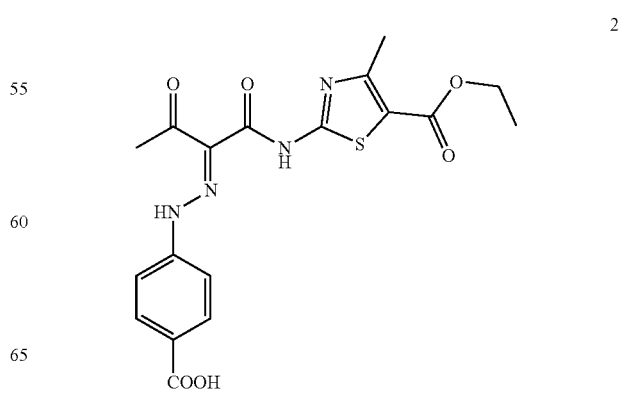

3
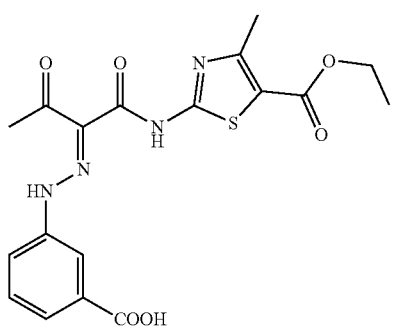
4
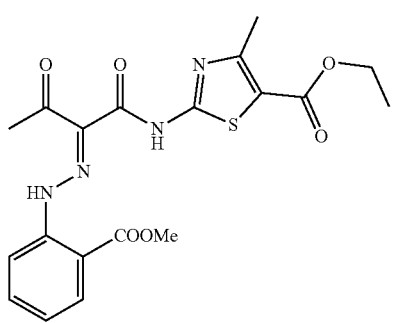
5
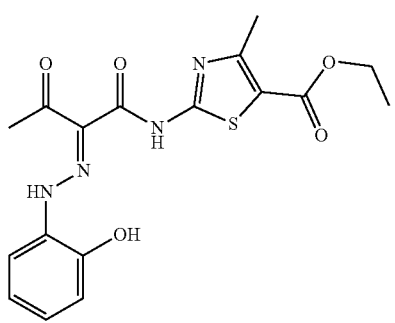
6
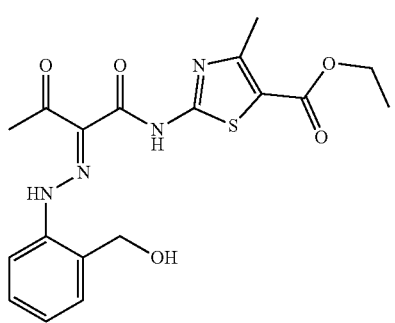
7
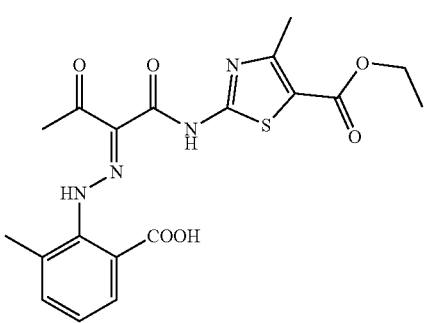
8
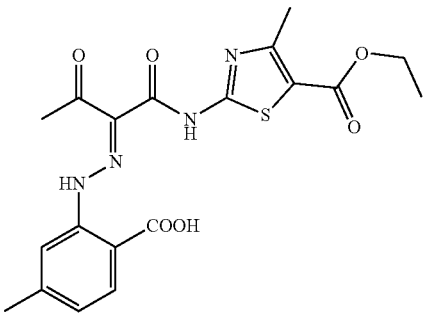
9
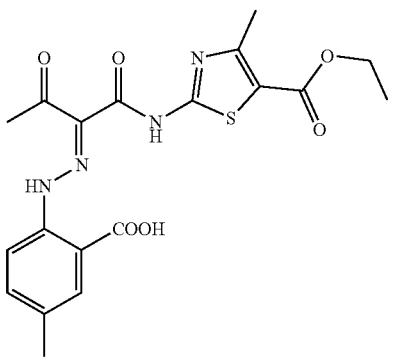
10
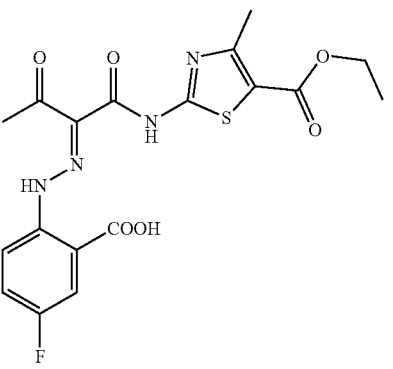
11
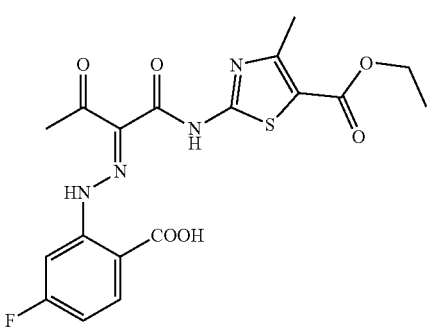

20
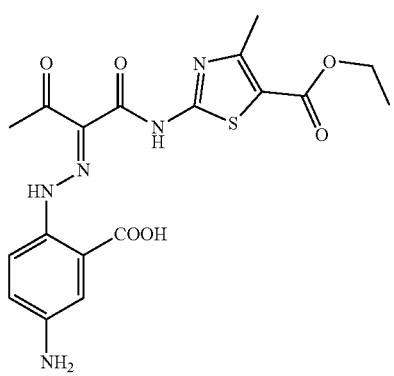
21
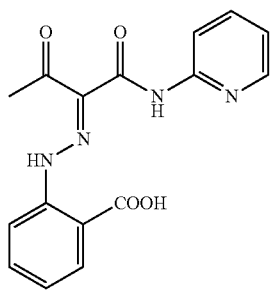
22
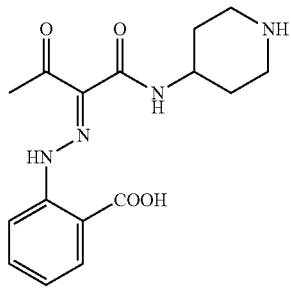
23
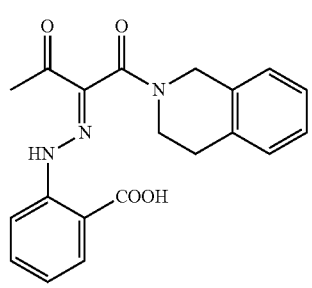
24
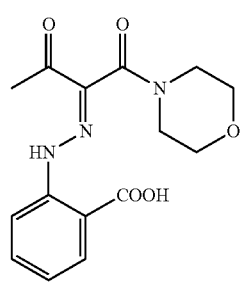
25
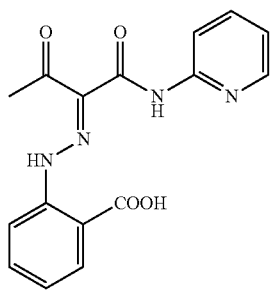
26
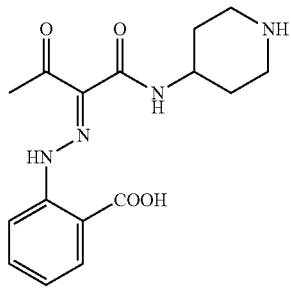
27
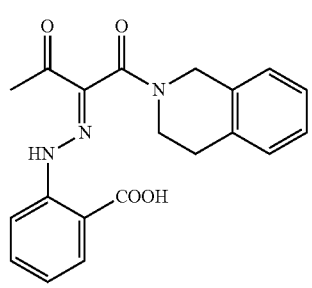
28
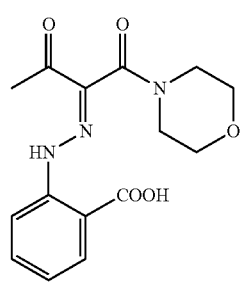
29
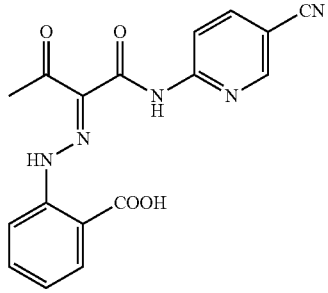

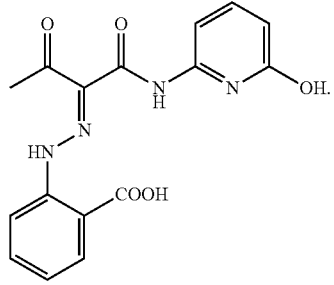

As a more preferred solution, compounds 2, 4, 24 and 28 among the above structural formulas have significant advantages in promoting hair follicle growth.

In a second aspect of the present disclosure, the present disclosure provides a pharmaceutical composition including the compound described above.

According to an embodiment of the present disclosure, the pharmaceutical composition further includes a pharmaceutically acceptable carrier, an excipient, a diluent, an adjuvant, a vehicle or any combination thereof.

In a third aspect of the present disclosure, the present disclosure provides use of the compound described above or the pharmaceutical composition described above in manufacture of a medicament for stimulating hair follicle growth.

In a fourth aspect of the present disclosure, the present disclosure provides use of the compound described above or the pharmaceutical composition described above in manufacture of a kit for stimulating hair follicle growth.

In a fifth aspect of the present disclosure, the present disclosure provides use of the compound described above or the pharmaceutical composition described above in manufacture of a medicament for treating or preventing alopecia.

Compared with the prior art, the present invention has the following advantages and effects:

The hydrazone amide derivatives provided by the present disclosure can stimulate hair follicle growth to some extent, and have better safety. The hydrazone amide derivatives provided by the present disclosure have a simple structure and easy to synthesize; moreover, these compounds have low toxicity and can be safely used for preventing and treating alopecia.

DESCRIPTION OF EMBODIMENTS

Figure 1:
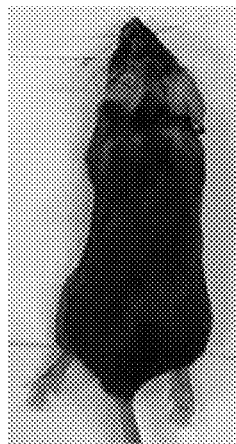
FIG. 1 shows the back hair of mice in a normal group according to an embodiment of the present disclosure.
Figure 2:
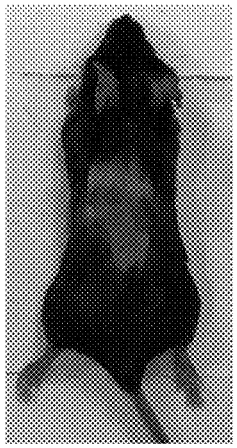
FIG. 2 shows the back hair of mice in a model group according to an embodiment of the present disclosure.

Embodiments of the present disclosure are described in detail below, and examples of the embodiments are shown in the accompanying drawings. The embodiments described below with reference to the accompanying drawings are illustrative, which aims to explain the present disclosure, but should not be interpreted as limiting the present disclosure.

The term "include" or "comprise" is an open-ended expression, i.e., including the content specified in the present disclosure but not excluding the content in other aspects.

"Stereoisomers" refer to compounds that have the same chemical structure but differ in the spatial arrangement of atoms or moieties. Stereoisomers include enantiomers, diastereomers, conformational isomers (rotamers), geometric isomers (cis/trans isomers), atropisomers, etc.

"Chirality" refers to a molecule that cannot overlap with its mirror image. "Achirality" refers to a molecule that can overlap with its mirror image.

"Enantiomers" refer to two isomers of a compound that are each a mirror image of the other one but cannot overlap with each other.

"Diastereomers" refer to stereoisomers that have two or more chiral centers and molecules of which are not mirror images of each other. Diastereomers have different physical properties such as melting point, boiling point, spectral properties and reactivity. A mixture of diastereomers can be separated by high-resolution analytical operations, for example, electrophoresis, and chromatography such as HPLC.

The definitions and rules of stereochemistry used in the present disclosure generally follow "McGraw-Hill Dictionary of Chemical Terms (1984)", S. P. Parker, Ed., McGraw-Hill Book Company, New York; and "Stereochemistry of Organic Compounds", Eliel, E. and Wilen, S., John Wiley & Sons, Inc., New York, 1994.

Many organic compounds exist in optically active forms, i.e., they are capable of rotating a plane of plane-polarized light. When describing optically active compounds, the prefixes D and L, or R and S are used to denote the absolute configurations of the molecule with respect to one or more chiral centers. The prefixes d and l, or (+) and (−) are symbols used to specify a rotation of plane-polarized light caused by a compound, where (−) or l indicates that the compound is levorotatory, and the prefix (+) or d indicates that the compound is dextrorotatory. When specific stereoisomers are enantiomers, and a mixture of such isomers is called an enantiomeric mixture. A mixture of enantiomers in 50:50 is called a racemic mixture or a racemate, which may occur when there is no stereoselectivity or stereospecificity in a chemical reaction or process.

Any asymmetric atom (for example, carbon, etc.) of the compound of the present disclosure can be present in a racemate- or enantiomer-enriched form, for example, present in (R)-, (S)-, or (R, S)-configuration. In some embodiments, in terms of (R)- or (S)-configuration, each asymmetric atom has an enantiomeric excess of at least 50%, an enantiomeric excess of at least 60%, an enantiomeric excess of at least 70%, an enantiomeric excess of at least 80%, an enantiomeric excess of at least 90%, an enantiomeric excess of at least 95%, or an enantiomeric excess of at least 99%.

In accordance with the selection of starting materials and methods, the compounds of the present disclosure may be present as one of the possible isomers or a mixture thereof, such as a racemate and a mixture of diastereomers, depending on the number of asymmetric carbon atoms. The optically active (R)- or (S)-isomers can be prepared using chiral synthons or chiral reagents, or resolved using conventional techniques. If the compound contains a double bond, the substituent may be in the E or Z configuration; and if the compound contains disubstituted cycloalkyl, the substituent of the cycloalkyl may have a cis or trans configuration.

Any obtained mixture of stereoisomers can be separated into pure or substantially pure stereoisomers, enantiomers, diastereomers according to the differences in physical and chemical properties of components, for example, by chromatography and/or fractional crystallization process.

The racemate of the obtained end-product or intermediate can be resolved into optical enantiomers by methods known to those skilled in the art, for example, by separating the obtained diastereomeric salts. Racemic products can also be separated by chiral chromatography, such as high-performance liquid chromatography (HPLC) using chiral adsorbents. Particularly, the enantiomers can be prepared by asymmetric synthesis, for example, referring to "Enantiomers, Racemates and Resolutions", Jacques, et al., Wiley Interscience, New York, 1981; "Principles of Asymmetric Synthesis", $2^{nd}$ Ed. Robert E. Gawley, Jeffrey Aube, Elsevier, Oxford, U K, 2012; "Stereochemistry of Carbon Compounds", Eliel, E. L., McGraw-Hill, N Y, 1962; "Tables of Resolving Agents and Optical Resolutions", p. 268, Wilen, S. H., E. L. Eliel, Ed., Univ. of Notre Dame Press, Notre Dame, in 1972; and "Chiral Separation Techniques. A Practical Approach", Subramanian, G. Ed., Wiley-VCH Verlag GmbH & Co. KGaA, Weinheim, Germany, 2007.

The term "tautomer" or "tautomeric form" refers to structural isomers that have different energies and can be interconverted by crossing a low energy barrier. If tautomerism is possible (for example, in solution), a chemical equilibrium of tautomers can be reached. For example, protontautomer (also known as prototropic tautomer) includes interconversion through proton migration, such as ketone-enol isomerization and imine-enamine isomerization. Valence tautomer includes interconversion through recombination of some bonding electrons. A specific example of ketone-enol tautomerization is interconversion of 2,4-pentanedione and 4-hydroxy-3-penten-2-one tautomeric isomers. Another example of tautomerism is phenol-ketone tautomerization. A specific example of phenol-ketone tautomerization is interconversion of 4-hydroxypyridine and pyridin-4(1H)-one tautomeric isomers. Unless otherwise indicated, all tautomeric forms of the compound of the present disclosure shall fall within the scope of the present disclosure.

In each part of the present specification, the substituents of the compounds disclosed in the present disclosure are disclosed according to the group types or ranges. In particular, the present disclosure includes each independent subcombination of respective members within these group types and ranges. For example, the term "$C_1$-$C_6$ alkyl" specifically refers to independently disclosed methyl, ethyl, $C_3$ alkyl, $C_4$ alkyl, $C_5$ alkyl, and $C_6$ alkyl.

In each part of the present disclosure, linking substituents are described. When the structure clearly requires a linking group, the Markush variables listed for the group should be understood as the linking group. For example, if the structure requires a linking group and the Markush group definition of the variable recites "alkyl" or "aryl", it should be understood that the "alkyl" or "aryl" respectively represents the linking alkylene group or arylene group.

As described in the present disclosure, the compounds of the present disclosure can be optionally substituted with one or more substituents, such as the compounds represented by the above general formulas, or particular examples, subclasses, and a type of compounds included in the present disclosure. It should be understood that the term "optionally substituted" and the term "substituted or unsubstituted" are interchangeably used. Generally speaking, the term "optionally", whether it precedes the term "substituted", means that one or more hydrogen atoms in a given structure may be substituted or unsubstituted by specific substituents. Unless otherwise indicated, an optionally substituted group may have a substituent substituted at each substitutable position of the group. When more than one position in the given structural formula can be substituted by one or more substituents selected from specific groups, the substituents substituted at the respective positions can be the same or different from each other.

The term "alkyl" used in the present disclosure includes linear or branched saturated monovalent hydrocarbyl group of 1-20 carbon atoms, where the alkyl can be independently and optionally substituted with one or more substituents described in the present disclosure. In some embodiments, the alkyl group contains 1-10 carbon atoms; in some other embodiments, the alkyl group contains 1-8 carbon atoms; in some other embodiments, the alkyl group contains 1-6 carbon atoms; in some other embodiments, the alkyl group contains 1-4 carbon atoms; in some other embodiments, the alkyl group contains 1-3 carbon atoms; and in some other embodiments, the alkyl group contains 2-6 carbon atoms. Further examples of the alkyl group include, but are not limited to, methyl (Me, —$CH_3$), ethyl (Et, —$CH_2CH_3$), n-propyl (n-Pr, —$CH_2CH_2CH_3$), isopropyl (i-Pr, —$CH(CH_3)_2$), n-butyl (n-Bu, —$CH_2CH_2CH_2CH_3$), 2-methylpropyl or isobutyl (i-Bu, —$CH_2CH(CH_3)_2$), 1-methylpropyl or sec-butyl (s-Bu, —$CH(CH_3)CH_2CH_3$), tert-butyl (t-Bu, —$C(CH_3)_3$), n-pentyl (—$CH_2CH_2CH_2CH_2CH_3$), 2-pentyl (—$CH(CH_3)CH_2CH_2CH_3$), 3-pentyl(—$CH(CH_2CH_3)_2$), 2-methyl-2-butyl(-$C(CH_3)_2CH_2CH_3$), 3-methyl-2-butyl(-$CH(CH_3)CH(CH_3)_2$), 3-methyl-1-butyl (—$CH_2CH_2CH(CH_3)_2$), 2-methyl-1-butyl (—$CH_2CH(CH_3)CH_2CH_3$), n-hexyl (—$CH_2CH_2CH_2CH_2CH_2CH_3$), 2-hexyl (—$CH(CH_3)CH_2CH_2CH_2CH_3$), 3-hexyl (—$CH(CH_2CH_3)(CH_2CH_2CH_3)$), 2-methyl-2-pentyl (—$C(CH_3)_2CH_2CH_2CH_3$), 3-methyl-2-pentyl (—$CH(CH_3)CH(CH_3)CH_2CH_3$), 4-methyl-2-pentyl (—$CH(CH_3)CH_2CH(CH_3)_2$), 3-methyl-3-pentyl (—$C(CH_3)(CH_2CH_3)_2$), 2-methyl-3-pentyl (—$CH(CH_2CH_3)CH(CH_3)_2$), 2, 3-dimethyl-2-butyl (—$C(CH_3)_2CH(CH_3)_2$), 3, 3-dimethyl-2-butyl (—$CH(CH_3)C(CH_3)_3$), n-heptyl, n-octyl, etc. The term "alkane group" and its prefix "alkane" used herein both include straight and branched saturated carbon chains.

The term "amino" refers to —$NH_2$.

The term "alkoxy" used in the present disclosure involves alkyl, as defined in the present disclosure, connected to a main carbon chain through an oxygen atom. Such examples include, but are not limited to, methoxy, ethoxy, propoxy, and the like.

The term "cycloalkyl" refers to a monovalent or multivalent saturated monocyclic, bicyclic or tricyclic ring system containing 3-12 carbon atoms. The bicyclic or tricyclic ring system may include fused rings, bridged rings, and spiro rings. In an embodiment, cycloalkyl contains 3-10 carbon atoms; in another embodiment, cycloalkyl contains 3-8 carbon atoms; in another embodiment, cycloalkyl contains 3-6 carbon atoms. Examples of cycloalkyl include, but are not limited to, cyclopropyl, cyclobutyl, cyclopentyl, cyclohexyl, and the like. The cycloalkyl group is optionally substituted with one or more substituents described in the present disclosure.

The term "aryl" refers to a monocyclic, bicyclic and tricyclic carbon ring system containing 6-14 ring atoms, or 6-12 ring atoms, or 6-10 ring atoms, at least one ring of which is aromatic. The aryl group is usually, but not necessarily, connected to the core moiety through the aromatic ring of the aryl group. The term "aryl" can be used interchangeably with the term "aromatic ring". Examples of the aryl may include phenyl, naphthyl, and anthranyl. The aryl group is optionally substituted with one or more substituents described in the present disclosure.

The term "heteroaromatic ring" refers to a monocyclic, bicyclic and tricyclic ring system containing 5-12 ring atoms, or 5-10 ring atoms, or 5-6 ring atoms, at least one ring of which is aromatic and at least one ring of which contains one or more heteroatoms. The heteroaromatic ring is usually, but not necessarily, connected to the core moiety through the aromatic ring of the heteroaromatic ring. The term "heteroaryl" can be used interchangeably with the term "heteroaromatic ring", "aromatic heterocyclic ring" or "heteroaromatic compound". The heteroaryl group is optionally substituted with one or more substituents described in the present disclosure. In an embodiment, the heteroaryl group, consisting of 5 to 10 atoms, contains 1, 2, 3, or 4 heteroatoms independently selected from O, S, or N.

Examples of the heteroaryl include, but are not limited to, 2-furyl, 3-furyl, N-imidazolyl, 2-imidazolyl, 4-imidazolyl, 5-imidazolyl, 3-isoxazolyl, 4-isoxazolyl, 5-isoxazolyl, 2-oxazolyl, 4-oxazolyl, 5-oxazolyl, N-pyrrolyl, 2-pyrrolyl, 3-pyrrolyl, 2-pyridyl, 3-pyridyl, 4-pyridyl, 2-pyrimidinyl, 4-pyrimidinyl, 5-pyrimidinyl, pyridazinyl (such as 3-pyridazinyl), 2-thiazolyl, 4-thiazolyl, 5-thiazolyl, tetrazolyl (such as 5-tetrazolyl), triazolyl (such as 2-triazolyl and 5-triazolyl), 2-thienyl, 3-thienyl, pyrazolyl (such as 2-pyrazolyl), isothiazolyl, 1,2,3-oxadiazolyl, 1,2,5-oxadiazolyl, 1,2,4-oxadiazolyl, 1,2,3-triazolyl, 1,2,3-thiodiazolyl, 1,3,4-thiodiazolyl, 1,2,5-thiodiazolyl, pyrazinyl, 1,3,5-triazinyl. Examples of heteroaryl further include, but not limited to, the following bicyclic rings: benzimidazolyl, benzofuranyl, benzothienyl, indolyl (such as 2-indolyl), purinyl, quinolinyl (such as 2-quinolinyl, 3-quinolinyl, 4-quinolinyl), isoquinolinyl (such as 1-isoquinolinyl, 3-isoquinolinyl or 4-isoquinolinyl), imidazo[1,2-a]pyridinyl, pyrazolo[1,5-a]pyridyl, pyrazolo[1,5-a]pyrimidinyl, imidazo[1,2-b]pyridazinyl, [1,2,4]triazolo[4,3-b]pyridazinyl, [1,2,4]triazolo[1,5-a]pyrimidinyl, [1,2,4]triazolo[1,5-a]pyridyl, etc.

As described in the present disclosure, a ring system with a substituent R' connected to a core ring of the ring system through one bond represents that the substituent R' can be substituted at any substitutable or any suitable position on the ring. For example, formula a represents that any substitutable position on the B' ring can be substituted with R', e.g., shown in formula b, formula c and formula d.

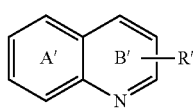

Formula a

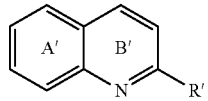

Formula b

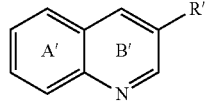

Formula c

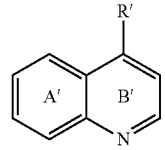

Formula d

In addition, it should be noted that, unless explicitly stated otherwise, the expressions used throughout the present disclosure such as "each of . . . and . . . is independently", " . . . and . . . are each independently" and " . . . and . . . are respectively independently" are interchangeable and should be understood in a broad sense. They mean that in different groups, the specific options expressed by the same symbols do not affect each other; or in the same group, the specific options expressed by the same symbols do not affect each other. For example, in "—(C($R^7$)$_2$)$_{n1}$—$NR^8$—(C(R)$_2$)$_{n1}$—", the specific options of each $R^7$ can be the same or different, and the expressed specific items can also be the same or different; the specific options of each n1 can be the same or different, and the expressed specific items can also be the same or different. Further, for example, in formula (I), the specific options of each of $R^2$, $R^3$ or $R^4$ may be the same or different, and the specific items expressed by $R^2$, $R^3$ and $R^4$ may also be the same or different.

The term "pharmaceutically acceptable" refers to molecular entities and compositions that are physiologically tolerable when administered to humans and generally do not produce allergies or similar inappropriate reactions, such as gastrointestinal discomfort, dizziness, and the like. Preferably, the term "pharmaceutically acceptable" as used herein refers to those approved by a federal regulatory agency or a national government or recorded in the US Pharmacopoeia or other generally recognized pharmacopoeia for use in animals, more particularly in humans.

The term "carrier" refers to a diluent, adjuvant, excipient or matrix that is administered together with the compound. These pharmaceutical carriers can be sterile liquids such as water and oils, including those derived from petroleum, animals, plants, or synthetic sources, such as peanut oil, soybean oil, mineral oil, sesame oil, and the like. Water, aqueous saline solution, aqueous dextrose, and glycerite are preferably used as carriers, especially for injectable solutions. Suitable carriers of medicaments are described in "Remington's Pharmaceutical Sciences", by E. W. Martin.

The "hydrate" of the present disclosure refers to the compound or its salt provided by the present disclosure with chemical or non-chemical equivalent water bonded thereto by non-covalent intermolecular force, i.e., an associated complex formed when the solvent molecule is water.

The "solvate" of the present disclosure refers to an associated complex formed by one or more solvent molecules and the compound of the present disclosure. The solvents for forming the solvate include, but are not limited to, water, isopropanol, ethanol, methanol, dimethyl sulfoxide, ethyl acetate, acetic acid, and aminoethanol.

The "nitrogen oxide" of the present disclosure means that, when the compound contains several amine functional groups, one or more nitrogen atoms can be oxidized to form N-oxide. Specific examples of N-oxides are N-oxides of tertiary amines or N-oxides of the nitrogen atom of nitrogen heterocycle. An oxidant such as hydrogen peroxide or peracid (such as peroxycarboxylic acid) can be used to process a corresponding amine to form N-oxide (see Advanced Organic Chemistry, Wiley Interscience, 4th edition, Jerry March, pages). In particular, N-oxides can be prepared by the method by L. W. Deady (Syn. Comm. 1977, 7, 509-514), in which, for example, the amine compound reacts with m-chloroperoxybenzoic acid (MCPBA) in an inert solvent such as dichloromethane.

The term "prodrug" used in the present disclosure indicates a compound that is converted into a compound represented by formula (I) in vivo. Such conversion is affected by a prodrug hydrolysis in blood or an enzymatic conversion into a parent structure in blood or tissues. The prodrug compounds of the present disclosure may be esters. In the present disclosure, the esters serving as prodrugs include phenyl esters, aliphatic ($C_{1-24}$) esters, acyloxymethyl esters, carbonate esters, carbamate esters and amino acid esters. For example, a compound in the present disclosure contains hydroxyl, which can be acylated to obtain a compound in the form of a prodrug. Other forms of the prodrug include phosphate esters, for example, the phosphate ester compounds obtained by phosphorylation of the hydroxyl group on the parent structure. For a full discussion of prodrugs, please refer to the following literatures: T. Higuchi and V. Stella, Pro-drugs as Novel Delivery Systems, Vol. 14 of the A.C.S. Symposium Series, Edward B. Roche, ed., Bioreversible Carriers in Drug Design, American Pharmaceutical Association and Pergamon Press, 1987, J. Rautio et al., Prodrugs: Design and Clinical Applications, *Nature Review Drug Discovery,* 2008, 7, 255-270, and S. J. Hecker et al., Prodrugs of Phosphates and Phosphonates, *Journal of Medicinal Chemistry,* 2008, 51, 2328-2345.

All tautomeric forms of the compounds of the present disclosure are included in the scope of the present disclosure, unless otherwise indicated.

In addition, the structural formulas of the compounds described in the present disclosure include enriched isotopes of one or more different atoms, unless otherwise indicated. The present disclosure includes isotopically-labeled compounds, which are equivalent to the compounds represented by formula (I), but one or more atoms thereof are replaced by atoms with atomic mass or mass number different from the common atomic mass or mass number in nature. Examples of isotopes that can be introduced in the compounds of the present disclosure include isotopes of hydrogen, carbon, nitrogen, oxygen, phosphorus, sulfur, fluorine, and chlorine, such as $^2H$, $^3H$, $^{13}C$, $^{11}C$, $^{14}C$, $^{15}N$, $^{18}O$, $^{17}O$, $^{31}P$, $^{32}P$, $^{35}S$, $^{18}F$ and $^{36}Cl$. The compounds of the present disclosure containing the above isotopes and/or other isotopes of other atoms, prodrugs thereof, and pharmaceutically acceptable salts of the compounds or the prodrugs all fall within the scope of the present disclosure. The isotopically-labeled compounds of formula (I) of the present disclosure and their prodrugs can generally be prepared in this way: when performing the following procedures and/or the processes disclosed in the examples and preparation examples, the non-isotopically labeled reagents are replaced by the isotopically-labeled reagents that are easily available.

"Metabolite" refers to a product obtained by metabolizing a specific compound or its salt in vivo. The metabolite of one compound can be identified by techniques well known in the art, and its activity can be characterized by assays as described in the present disclosure. Such a product may be obtained through oxidation, reduction, hydrolysis, amidation, deamidation, esterification, de-esterification, or enzyme cleavage of the administrated compound, or the like. Accordingly, the present disclosure includes the metabolites of the compound, including metabolites produced by fully contacting the compound of the present disclosure with a mammal for a period of time.

Various pharmaceutically acceptable salt forms of the compounds of the present disclosure are useful. The term "pharmaceutically acceptable salts" refers to the salt forms that are apparent to pharmaceutical chemists, that is, they are substantially non-toxic and can provide the desired pharmacokinetic properties, palatability, absorption, distribution, metabolism or excretion. Other factors, which are more practical in terms of properties and are also important in terms of selection, include: the cost of raw materials, ease of crystallization, yield, stability, hygroscopicity, and fluidity of the resulting crude drugs. In brief, the pharmaceutical composition can be prepared from an active component and a pharmaceutically acceptable carrier.

As used herein, a "pharmaceutically acceptable salt" refers to an organic or inorganic salt of the compound of the present disclosure. The pharmaceutically acceptable salts are well known in the art, as described in the literature: S. M. Berge et al., describe pharmaceutically acceptable salts in detail in J. Pharmaceutical Sciences, 66: 1-19, 1977. Salts formed by pharmaceutically acceptable non-toxic acids include, but are not limited to, inorganic acid salts formed by reacting with amino groups, including hydrochloride, hydrobromide, phosphate, sulfate, perchlorate, nitrate, etc; and organic acid salts such as acetate, propionate, glycollate, oxalate, maleate, malonate, succinate, fumarate, tartrate, citrate, benzoate, mandelate, methanesulfonate, ethanesulfonate, tosylate, sulfosalicylate, etc., or the salts obtained through other methods such as ion exchange described in book literatures.

Other pharmaceutically acceptable salts include adipate, malate, 2-hydroxypropionic acid, alginate, ascorbate, aspartate, benzenesulfonate, benzoate, bisulfate, borate, butyrate, camphorate, camphorsulfonate, cyclopentylpropionate, digluconate, dodecyl sulfate, esilate, formate, fumarate, gluceptate, glycerophosphate, gluconate, hemisulphate, enanthate, caproate, hydriodate, 2-hydroxy-ethanesulfonate, lactobionic acid salt, lactate, laurate, lauryl sulfate, malate, malonate, methanesulfonate, 2-naphthalenesulfonate, nicotinate, nitrate, oleate, palmitate, pamoate, pectate, persulfate, 3-phenylpropionate, picrate, pivalate, propionate, stearate, thiocyanate, p-toluene sulfonate, undecanoate, valerate, etc. Salts obtained from suitable bases include salts of alkali metal, alkaline earth metal, ammonium, and $N^+(C_{1-4}\text{ alkyl})_4$.

The present disclosure also contemplates quaternary ammonium salts formed by any compound with a group containing N. Water-soluble or oil-soluble or dispersed products can be obtained by quaternization. The salts of alkali metal or alkaline earth metal include sodium salts, lithium salts, potassium salts, calcium salts, magnesium salts, iron salts, zinc salts, copper salts, manganese salts, aluminum salts, etc. The pharmaceutically acceptable salts further include suitable and non-toxic ammoniums, quaternary ammonium salts and amine cations formed by counterions, such as halides, hydroxides, carboxylates, hydrosulfates, phosphates, nitrates, $C_{1-8}$ sulfonates and aromatic sulfonates. The ammonium salts, such as but not limited to N, N'-dibenzylethylenediamine, chloroprocaine, choline, ammonia, diethanolamine and other hydroxyalkylamines, ethylenediamine, N-methyl glucosamine, procaine, N-benzylphenethylamine, 1-p-chlorobenzyl-2-pyrrolidine-1'-ylmethyl-benzimidazole, diethylamine and other alkylamines, piperazine, and tris(hydroxymethyl)aminomethane; alkaline earth metal salts, such as but not limited to barium, calcium and magnesium; transition metal salts, for example, including, but not limited to zinc.

In this specification, the structure shall prevail if the chemical name is different from the chemical structure.

Unless otherwise specified, the abbreviations of any amino acids and other compounds used in the present disclosure are the commonly used and recognized abbreviations, or refer to IUPAC-IUB Commission on Biochemical Nomenclature (see Biochem. 1972, 11: 942-944).

One object of the present disclosure is to provide a new compound with the effect of stimulating hair follicle growth.

A second object of the present disclosure is to provide a new compound with remarkable effects in treatment or prevention of alopecia.

A third object of the present disclosure is to provide a preparation method of the compound with the effect of stimulating hair follicle growth.

A fourth object of the present disclosure is to provide use of the compound in treating or preventing alopecia.

The compound provided by the present disclosure has significant activity in stimulating hair follicle growth, and can be used as a lead compound for treating or preventing alopecia.

The present disclosure will be further illustrated below with reference to specific examples and drawings, but the examples do not limit the present disclosure in any form. Unless otherwise specified, the reagents, methods and devices adopted in the present disclosure are conventional reagents, methods and devices in the art.

Unless otherwise specified, the reagents and materials used in the present disclosure are all commercially available.

Example 1 Synthesis of Hydrazone Amide Derivatives

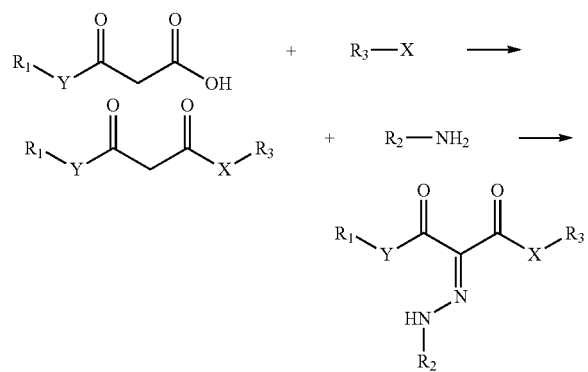

The synthesis scheme of hydrazone amide derivatives is illustrated as above. Substituted acetoacetic acid, 1,3-dicyclohexylcarbodiimide (DCC), 4-dimethylaminopyridine (DMAP), and substituted alcohol or ammonia were added into dichloromethane, and stirred for 8 h at room temperature. The solvent was removed using a rotary evaporator, and the corresponding acetoacetamide or acetoacetate was obtained after purifying with column chromatography.

Ammonias with different substituents were added to methanol, and hydrochloric acid and sodium nitrite in equal amounts were added and stirred at room temperature for 0.5 hours. Then, the substituted acetoacetamide or acetoacetate was added and stirred at room temperature for 10 hours, and the desired hydrazone amide derivatives were obtained after filtering.

Example 2 Synthesis of Compound 1

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 70 mg of 2-aminobenzoic acid reacted together to obtain 150 mg of Compound 1, with a yield of 72%.

Example 3 Synthesis of Compound 2

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 70 mg of 4-aminobenzoic acid reacted together to obtain 160 mg of Compound 2, with a yield of 77%.

Example 4 Synthesis of Compound 3

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 70 mg of 3-aminobenzoic acid reacted together to obtain 141 mg of Compound 3, with a yield of 67%.

Example 5 Synthesis of Compound 4

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 75 mg of methyl 2-aminobenzoate reacted together to obtain 187 mg of Compound 4, with a yield of 86%.

Example 6 Synthesis of Compound 5

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 54 mg of 2-aminophenol reacted together to obtain 103 mg of Compound 5, with a yield of 53%.

Example 7 Synthesis of Compound 6

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 62 mg of 2-aminobenzyl alcohol reacted together to obtain 155 mg of Compound 6, with a yield of 77%.

Example 8 Synthesis of Compound 7

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 76 mg of 2-amino-3-methylbenzoic acid reacted together to obtain 124 mg of Compound 7, with a yield of 57%.

Example 9 Synthesis of Compound 8

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 76 mg of 2-amino-4-methylbenzoic acid reacted together to obtain 132 mg of Compound 8, with a yield of 61%.

Example 10 Synthesis of Compound 9

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 76 mg of 2-amino-5-methyl-benzoic acid reacted together to obtain 105 mg of Compound 9, with a yield of 49%.

Example 11 Synthesis of Compound 10

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 77 mg of 2-amino-5-fluorobenzoic acid reacted together to obtain 108 mg of Compound 10, with a yield of 50%.

Example 12 Synthesis of Compound 11

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 77 mg of 2-amino-4-fluorobenzoic acid reacted together to obtain 136 mg of Compound 11, with a yield of 62%.

Example 13 Synthesis of Compound 12

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 81 mg of 2-amino-3-cyanobenzoic acid reacted together to obtain 92 mg of Compound 12, with a yield of 41%.

Example 14 Synthesis of Compound 13

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 76 mg of 2-amino-4-cyanobenzoic acid reacted together to obtain 172 mg of Compound 13, with a yield of 78%.

Example 15 Synthesis of Compound 14

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 91 mg of 2-amino-5-nitrobenzoic acid reacted together to obtain 167 mg of Compound 14, with a yield of 72%.

Example 16 Synthesis of Compound 15

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 85 mg of 2-amino-5-chlorobenzoic acid reacted together to obtain 179 mg of Compound 15, with a yield of 79%.

Example 17 Synthesis of Compound 16

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 70 mg of 4-amino-5-pyridinedicarboxylic acid reacted together to obtain 164 mg of Compound 16, with a yield of 79%.

Example 18 Synthesis of Compound 17

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 76 mg of 4-amino-5-hydroxylbenzoic acid reacted together to obtain 133 mg of Compound 17, with a yield of 61%.

Example 19 Synthesis of Compound 18

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 91 mg of 2-aminoisophthalic acid reacted together to obtain 111 mg of Compound 18, with a yield of 48%.

Example 20 Synthesis of Compound 19

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 91 mg of 2-aminoterephthalic acid reacted together to obtain 141 mg of Compound 19, with a yield of 61%.

Example 21 Synthesis of Compound 20

According to the procedure described in Example 1, 186 mg of ethyl 2-amino-4-methylthiazole-5-carboxylate, 206 mg of DCC, 10 mg of DMAP, and 102 mg of 3-oxobutyric acid reacted together to obtain 200 mg of ethyl-4-methyl-2-acetoacetylthiazolamide-5-carboxylate, with a yield of 74%.

135 mg of ethyl-4-methyl-2-acetoacetylthiazolamide-5-carboxylate, 0.5 ml of hydrochloric acid (1M), 34 mg of sodium nitrite, and 76 mg of 2, 5-diaminobenzoic acid reacted together to obtain 130 mg of Compound 20, with a yield of 62%.

Example 22 Synthesis of Compound 21

According to the procedure described in Example 1, 114 mg of 2-amino-4-methylthiazole, 206 mg of DCC, 10 mg of DMAP, and 102 mg of 3-oxobutyric acid reacted together to obtain 185 mg of 4-methyl-2-acetoacetylthiazolamide, with a yield of 93%.

100 mg of 4-methyl-2-acetoacetylthiazolamide, 0.5 ml of hydrochloric acid (1M), 34 mg of sodium nitrite, and 70 mg of 2-aminobenzoic acid reacted together to obtain 102 mg of Compound 21, with a yield of 59%.

Example 23 Synthesis of Compound 22

As described in Example 1, 100 mg of 2-aminothiazole, 206 mg of DCC, 10 mg of DMAP, and 102 mg of 3-oxobutyric acid reacted together to obtain 139 mg of 2-acetoacetylthiazolamide, with a yield of 76%.

91 mg of 2-acetoacetylthiazolamide, 0.5 ml of hydrochloric acid (1M), 34 mg of sodium nitrite, and 70 mg of 2-aminobenzoic acid reacted together to obtain 102 mg of Compound 22, with a yield of 59%.

Example 24 Synthesis of Compound 23

According to the procedure described in Example 1, 150 mg of 2-amino-benzothiazole, 206 mg of DCC, 10 mg of DMAP, and 102 mg of 3-oxobutyric acid reacted together to obtain 158 mg of 2-acetoacetylbenzothiazolamide, with a yield of 68%.

116 mg of 2-acetoacetylbenzothiazolamide, 0.5 ml of hydrochloric acid (1M), 34 mg of sodium nitrite, and 70 mg of 2-aminobenzoic acid reacted together to obtain 117 mg of Compound 23, with a yield of 61%.

Example 25 Synthesis of Compound 24

According to the procedure described in Example 1, 92 mg of aniline, 206 mg of DCC, 10 mg of DMAP, and 102 mg of 3-oxobutyric acid reacted together to obtain 125 mg of acetoacetanilide, with a yield of 71%.

88 mg of acetoacetanilide, 0.5 ml of hydrochloric acid (1M), 34 mg of sodium nitrite, and 70 mg of 2-aminobenzoic acid reacted together to obtain 97 mg of Compound 24, with a yield of 59%.

Example 26 Synthesis of Compound 25

According to the procedure described in Example 1, 93 mg of 2-aminopyridine, 206 mg of DCC, 10 mg of DMAP, and 102 mg of 3-oxobutyric acid reacted together to obtain 104 mg of 2-acetoacetpyridinamine, with a yield of 59%.

88 mg of 2-acetoacetpyridinamine, 0.5 ml of hydrochloric acid (1M), 34 mg of sodium nitrite, and 70 mg of 2-aminobenzoic acid reacted together to obtain 85 mg of Compound 25, with a yield of 52%.

Example 27 Synthesis of Compound 26

According to the procedure described in Example 1, 99 mg of 4-aminopiperidine, 206 mg of DCC, 10 mg of DMAP, and 102 mg of 3-oxobutyric acid reacted together to obtain 128 mg of 3-oxo-N-piperidine-4-butanamide, with a yield of 70%.

91 mg of 3-oxo-N-piperidine-4-butanamide, 0.5 ml of hydrochloric acid (1M), 34 mg of sodium nitrite, and 70 mg of 2-aminobenzoic acid reacted together to obtain 75 mg of Compound 26, with a yield of 45%.

Example 28 Synthesis of Compound 27

According to the procedure described in Example 1, 133 mg of tetrahydroisoquinoline, 206 mg of DCC, 10 mg of DMAP, and 102 mg of 3-oxobutyric acid reacted together to obtain 129 mg of 1-tetrahydroisoquinolinebutyl-1,3-dione, with a yield of 60%.

108 mg of 1-tetrahydroisoquinolinebutyl-1,3-dione, 0.5 ml of hydrochloric acid (1M), 34 mg of sodium nitrite, and 70 mg of 2-aminobenzoic acid reacted together to obtain 86 mg of Compound 27, with a yield of 47%.

Example 29 Synthesis of Compound 28

According to the procedure described in Example 1, 88 mg of morpholine, 206 mg of DCC, 10 mg of DMAP, and 102 mg of 3-oxobutyric acid reacted together to obtain 106 mg of acetoacetylmorpholinylamine, with a yield of 63%.

85 mg of acetoacetylmorpholinylamine, 0.5 ml of hydrochloric acid (1M), 34 mg of sodium nitrite, and 70 mg of 2-aminobenzoic acid reacted together to obtain 89 mg of Compound 28, with a yield of 56%.

Example 30 Synthesis of Compound 29

According to the procedure described in Example 1, 119 mg of 2-amino-5-cyanopyridine, 206 mg of DCC, 10 mg of DMAP, and 102 mg of 3-oxobutyric acid reacted together to obtain 137 mg of 5-cyanopyridine-2-acetoacetamide, with a yield of 67%.

101 mg of 5-cyanopyridine-2-acetoacetamide, 0.5 ml of hydrochloric acid (1M), 34 mg of sodium nitrite, and 70 mg of 2-aminobenzoic acid reacted together to obtain 88 mg of Compound 29, with a yield of 50%.

Example 31 Synthesis of Compound 32

According to the procedure described in Example 1, 110 mg of 2-amino-6-hydroxylpyridine, 206 mg of DCC, 10 mg of DMAP, and 102 mg of 3-oxobutyric acid reacted together to obtain 160 mg of 6-hydroxylpyridine-2-acetoacetamide, with a yield of 83%.

96 mg of 6-hydroxylpyridine-2-acetoacetamide, 0.5 ml of hydrochloric acid (1M), 34 mg of sodium nitrite, and 70 mg of 2-aminobenzoic acid reacted together to obtain 106 mg of Compound 30, with a yield of 62%.

Example 32 Animal Experiments

Experiment method: 100 8-week-old female mice were divided into 10 groups with 10 mice in each group. They were randomly divided into a normal group, a model group and administration groups. The mice in the model group and the administration groups were fasted overnight and subjected to bilateral ovariectomy after anesthesia with 0.1 ml of 10% chloral hydrate. After the bilateral ovariectomy, penicillin injection 0.1 ml/per mouse was injected once a day for seven times to prevent infection. After 4 weeks of modeling, the experiment was carried out by oral administration. The medicament was prepared with normal saline, and administered 10 mg/kg/day to each mouse in the administration groups. The normal group and model group were given only normal saline. After 4 weeks of administration, the hair on the back of the mice was observed.

Efficacy Evaluation:

Cured: Alopecia was completely cured, with no difference with the normal group.

Ameliorated: Alopecia was ameliorated, with significant difference from the model group, but small difference from the normal group.

Ineffective: Alopecia was not ameliorated, with no difference from the model group.

The therapeutic effect is shown in Table 1.

TABLE 1

Therapeutic effect of alopecia in mice after administration

| Group | Drug No. | Quantity | Cured | Ameliorated | Ineffective | Total effective rate (%) |
|---|---|---|---|---|---|---|
| Administration group 1 | 2 | 10 | 10 | 0 | 0 | 100% |
| Administration group 2 | 4 | 10 | 8 | 2 | 0 | 100% |
| Administration group 3 | 10 | 10 | 2 | 3 | 5 | 50% |
| Administration group 4 | 12 | 10 | 8 | 1 | 1 | 90% |
| Administration group 5 | 17 | 10 | 7 | 1 | 2 | 80% |
| Administration group 6 | 24 | 10 | 10 | 0 | 0 | 100% |
| Administration group 7 | 28 | 10 | 10 | 0 | 0 | 100% |
| Administration group 8 | 30 | 10 | 4 | 3 | 3 | 70% |

Figure 3:
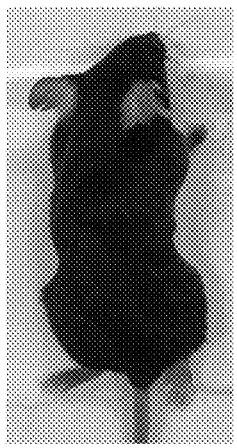
FIG. 3 shows the back hair of mice in administration group 1 according to an embodiment of the present disclosure.
Figure 4:
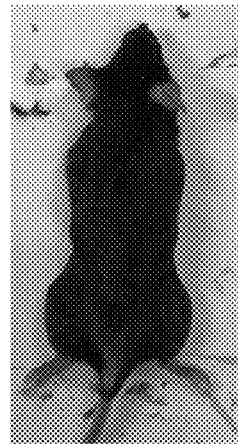
FIG. 4 shows the back hair of mice in administration group 2 according to an embodiment of the present disclosure.
Figure 5:
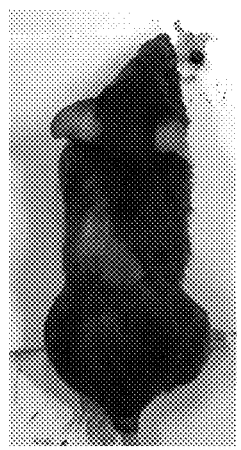
FIG. 5 shows the back hair of mice in administration group 3 according to an embodiment of the present disclosure.
Figure 6:
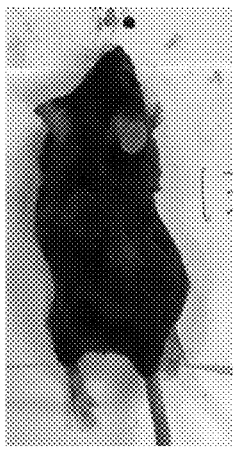
FIG. 6 shows the back hair of mice in administration group 4 according to an embodiment of the present disclosure.
Figure 7:
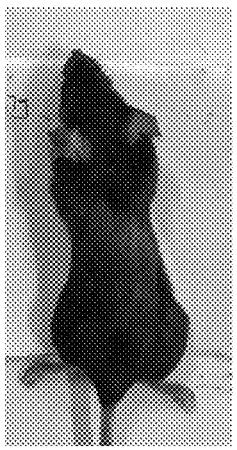
FIG. 7 shows the back hair of mice in administration group 5 according to an embodiment of the present disclosure.
Figure 8:
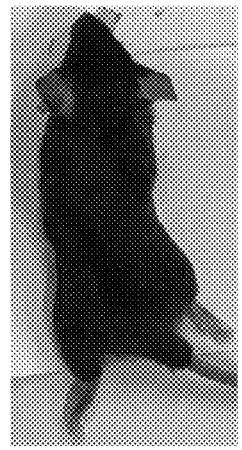
FIG. 8 shows the back hair of mice in administration group 6 according to an embodiment of the present disclosure.
Figure 9:
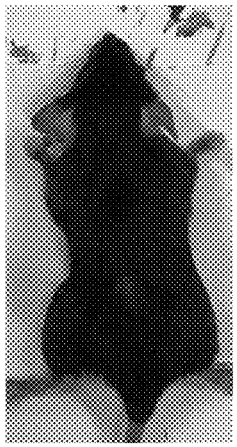
FIG. 9 shows the back hair of mice in administration group 7 according to an embodiment of the present disclosure.
Figure 10:
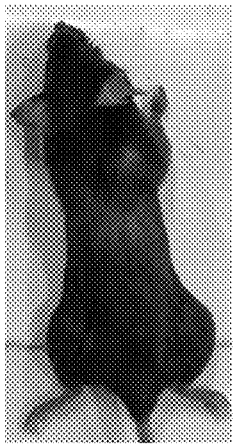
FIG. 10 shows the back hair of mice in administration group 8 according to an embodiment of the present disclosure.

It can be seen from Table 1 that the total effective rates of compounds 2, 4, 24 and 28 were all 100%. The cure rates of compounds 2, 24 and 28 were 100%. As shown in FIGS. 3, 8 and 9, the hair of mice given these three drugs could be completely recovered, with no difference from the normal group (FIG. 1). The results show that these compounds can effectively promote the growth of hair and can be used as a new class of drugs for treating alopecia.

In the description of this specification, the description referring to the terms "an embodiment", "some embodiments", "an example", "specific examples", or "some examples" means that the specific features, structures, materials or characteristics described in conjunction with the embodiment or example are included in at least one embodiment or example of the present disclosure. In this specification, the schematic expression of the above terms does not necessarily refer to the same embodiment or example. Moreover, the described specific features, structures, materials, or characteristics may be combined in any one or more embodiments or examples in any suitable manner. In addition, without contradicting each other, different embodiments or examples and features of different embodiments or examples described in the specification can be combined by those skilled in the art.

Although the embodiments of the present disclosure have been shown and described above, it should be understood that the above-mentioned embodiments are illustrative and shall not be interpreted as limiting the present disclosure, and within the scope of the present disclosure, those skilled in the art can make changes, modifications, replacements and variations to the above embodiments.

What is claimed is:

1. A method for stimulating hair follicle growth, comprising: administering to a subject in need thereof a compound having one of the following structures, or a stereoisomer, a geometric isomer, a tautomer, a nitrogen oxide, a hydrate, a solvate, a pharmaceutically acceptable salt or a prodrug of the compound having one of the following structures:

1

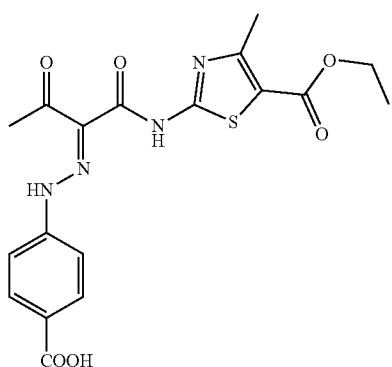

2

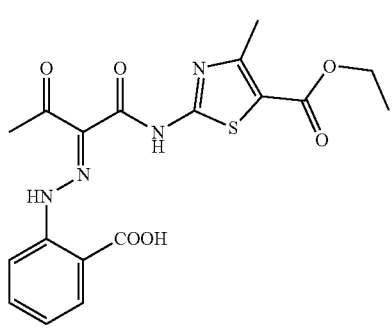

3

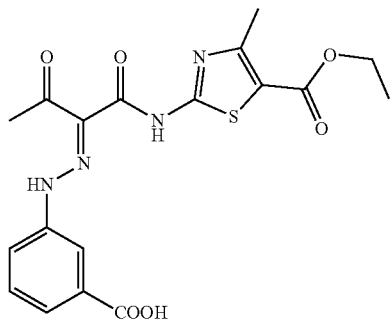

4

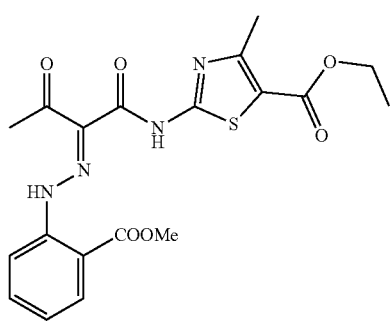

5

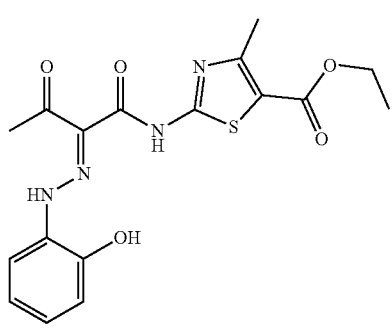

6

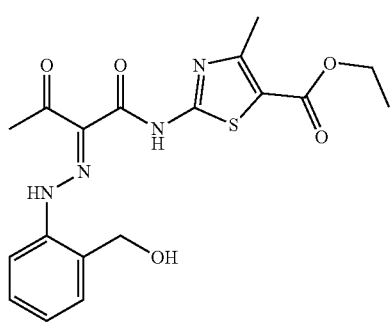

7

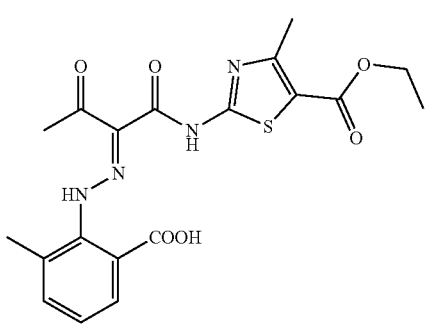

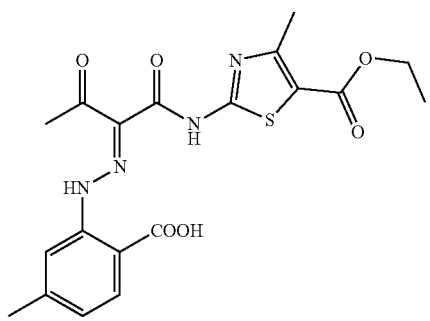
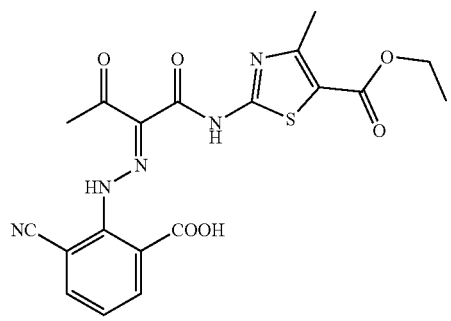
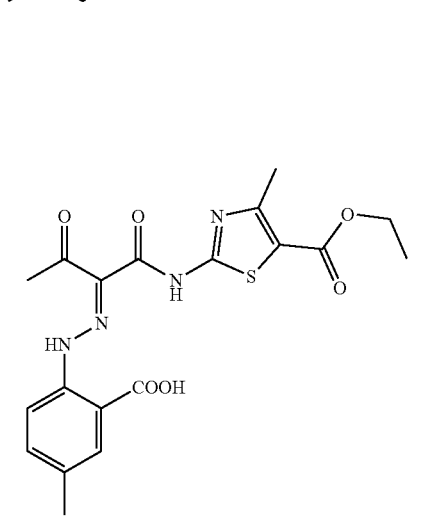
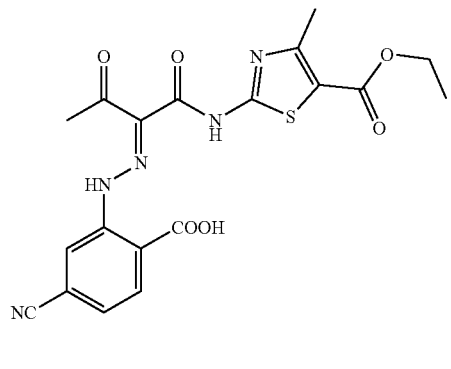
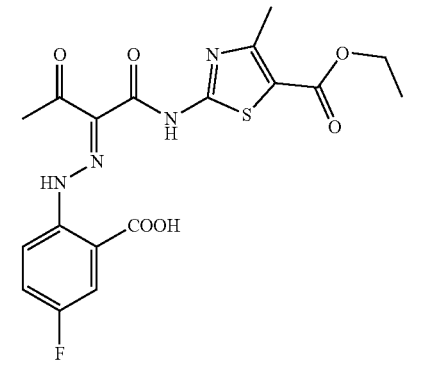
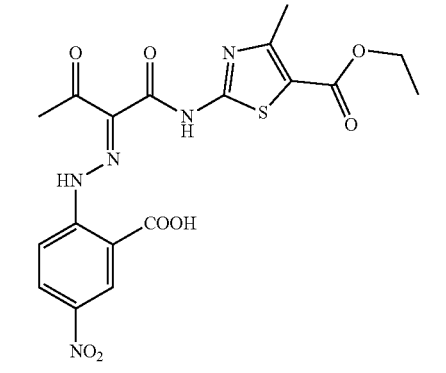
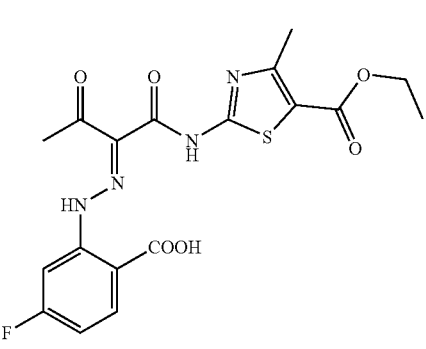
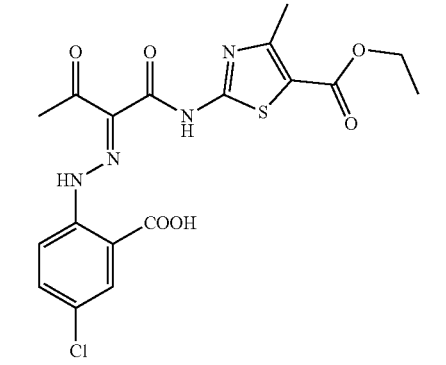

16
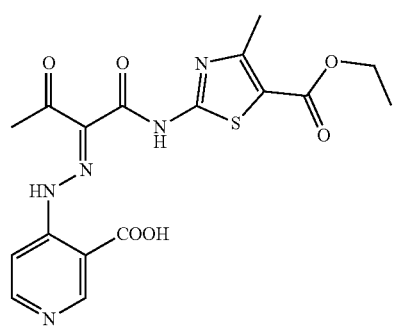
17
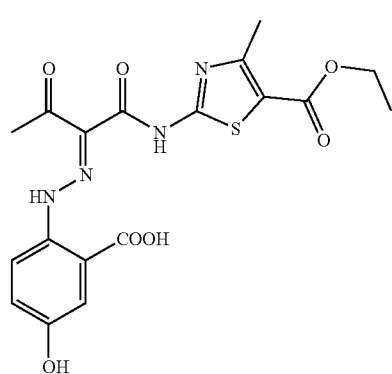
18
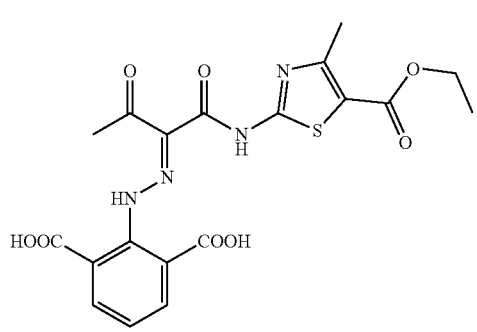
19
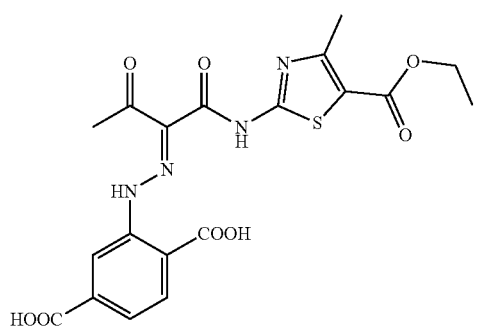
20
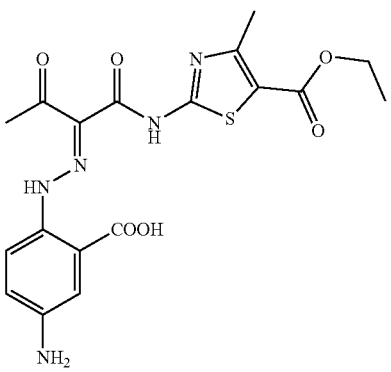
21
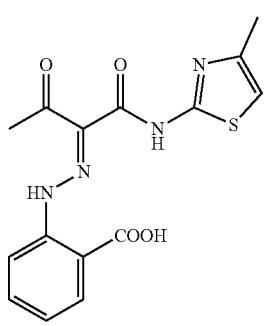
22
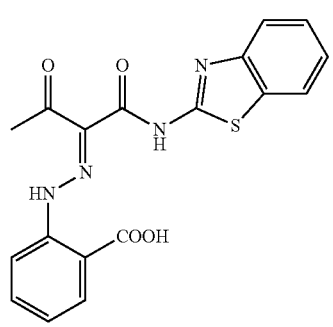
23
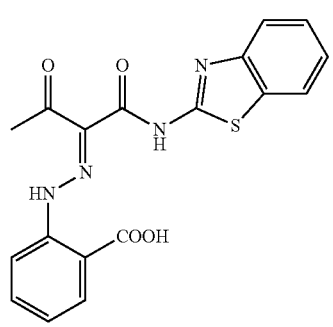
24
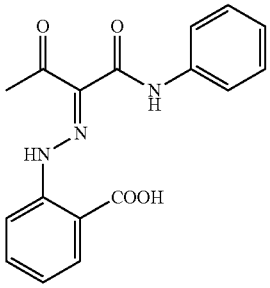

25
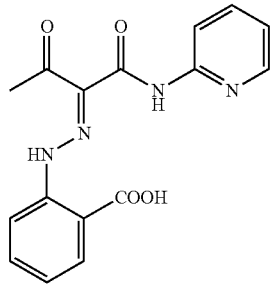
26
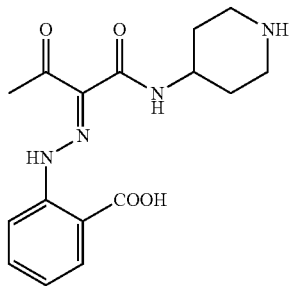
27
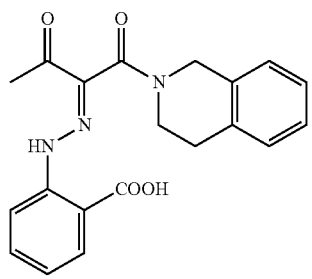
28
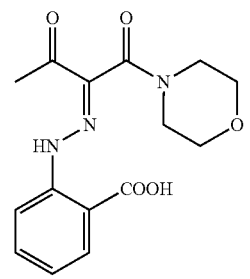
29
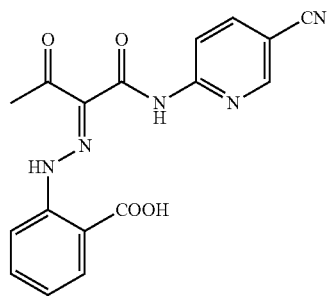
30
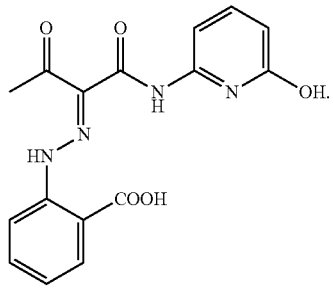
2. A method for treating alopecia, comprising: administering to a patient a compound having one of the following structures, or a stereoisomer, a geometric isomer, a tautomer, a nitrogen oxide, a hydrate, a solvate, a pharmaceutically acceptable salt or a prodrug of the compound having one of the following structures:
1
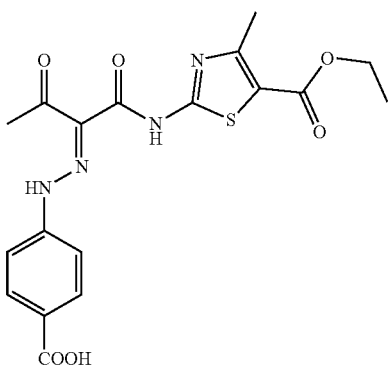
2
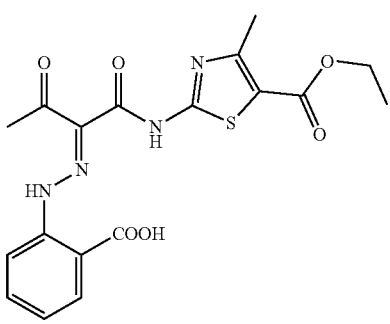
3
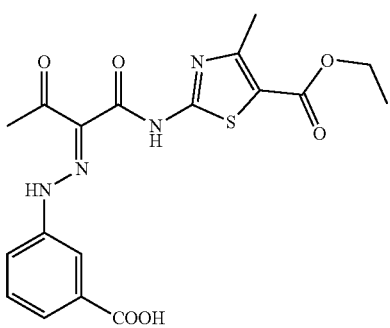

| 4 | 9 |
|---|---|
| 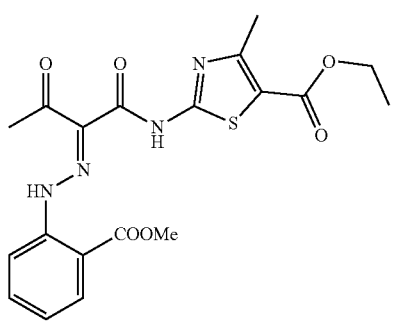 | 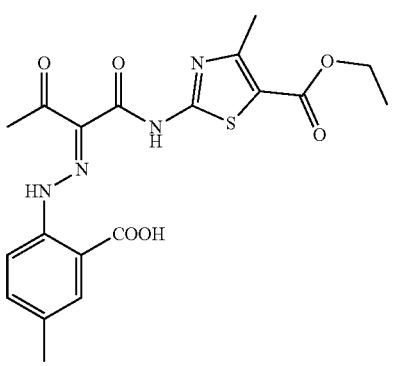 |
| 5 | 10 |
| 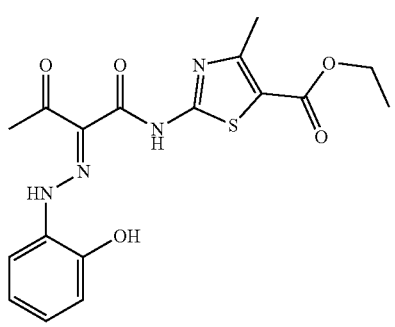 | 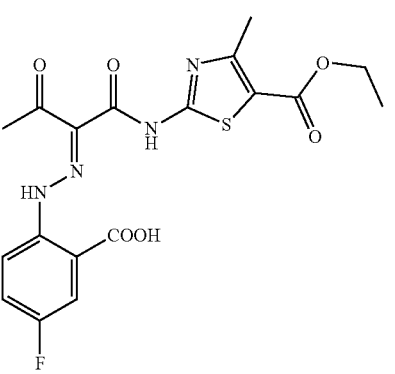 |
| 6 | 11 |
| 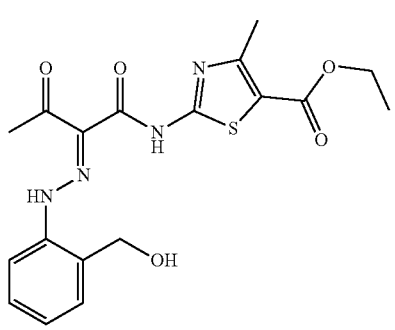 | 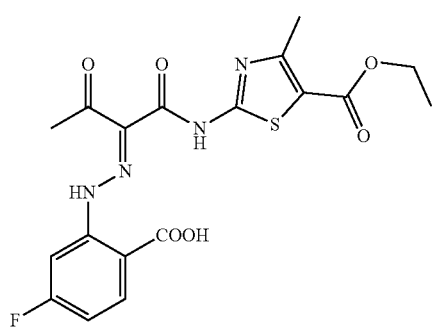 |
| 7 | 12 |
| 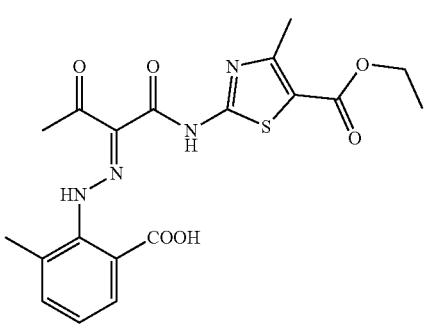 | 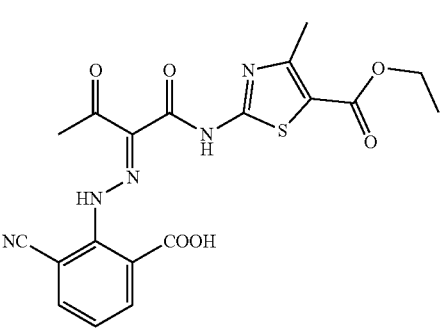 |
| 8 | |
| 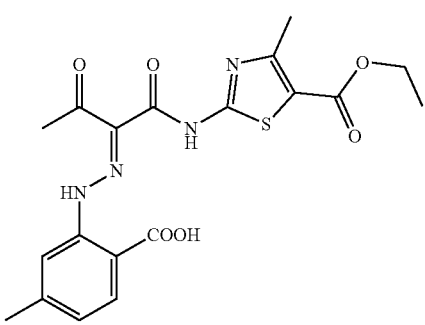 | |

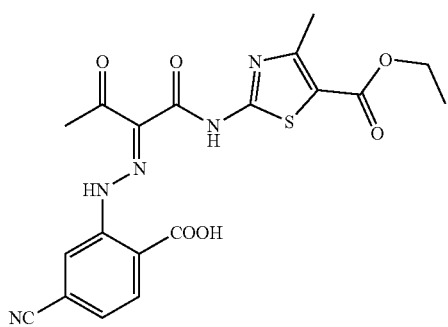
13
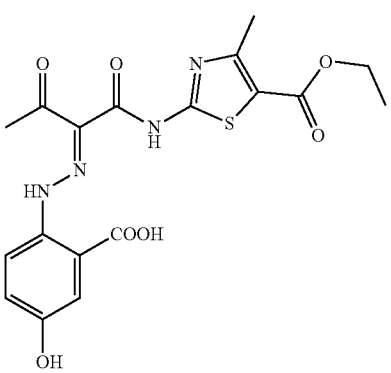
17
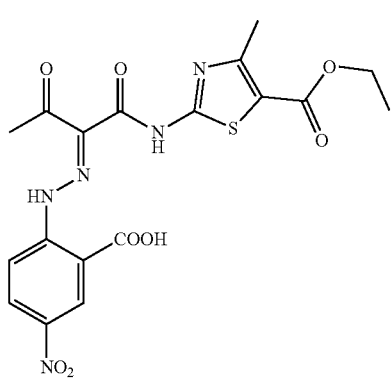
14
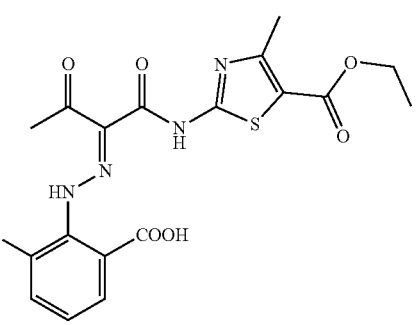
18
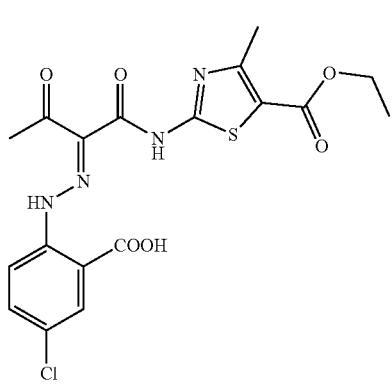
15
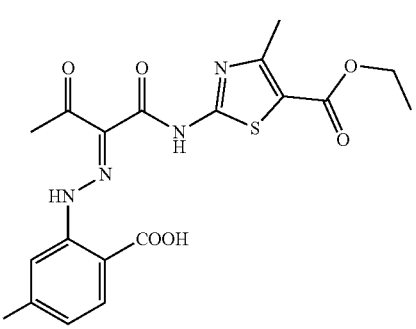
19
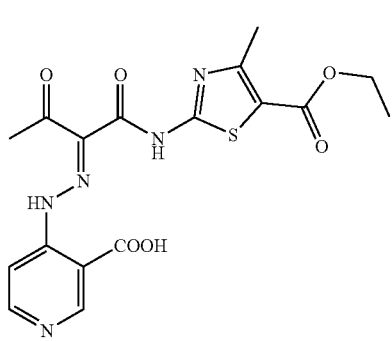
16
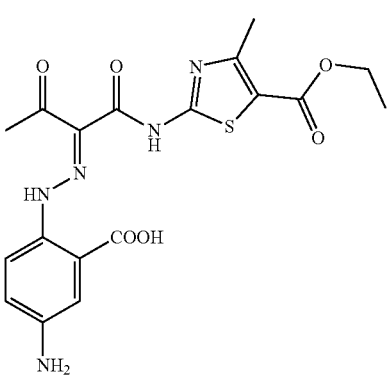
20

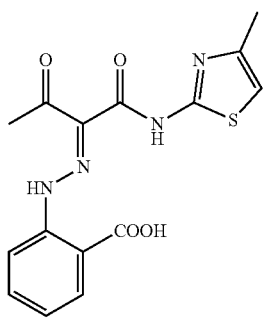
21
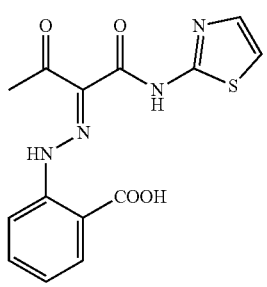
22
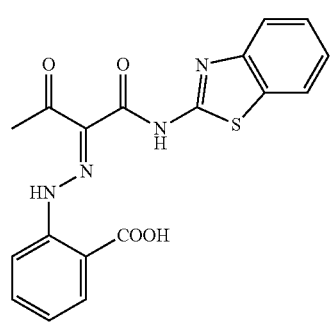
23
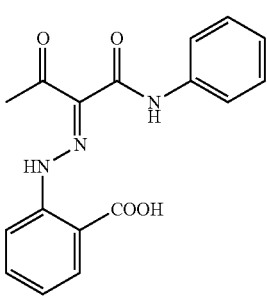
24
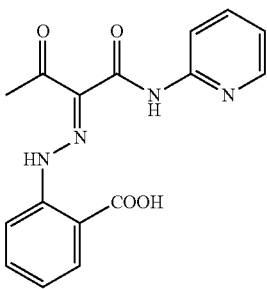
25
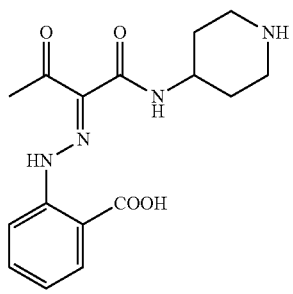
26
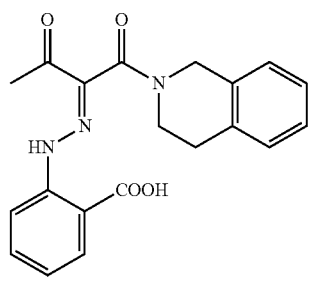
27
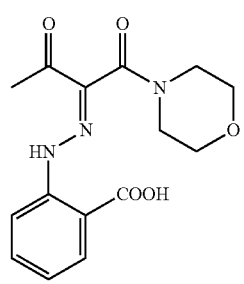
28
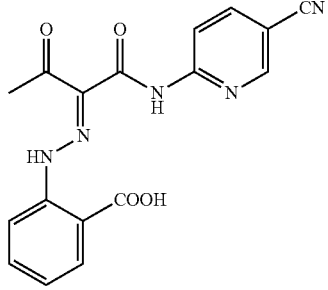
29
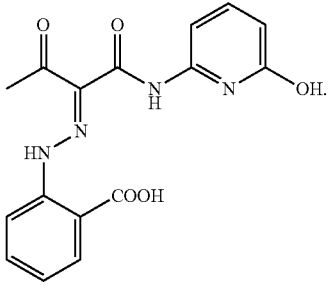
30
3. A method for stimulating hair follicle growth or for treating alopecia, comprising: administering a pharmaceutical composition to a patient, wherein the pharmaceutical composition comprises:
a compound having one of the following structures, or a stereoisomer, a geometric isomer, a tautomer, a nitrogen oxide, a hydrate, a solvate, a pharmaceutically acceptable salt or a prodrug of the compound having one of the following structures:
1
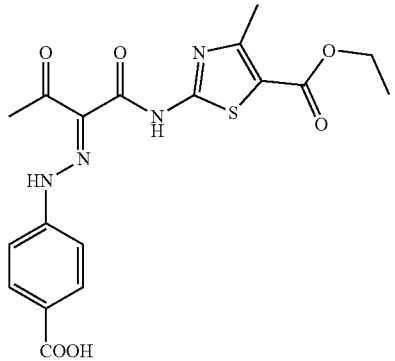
2
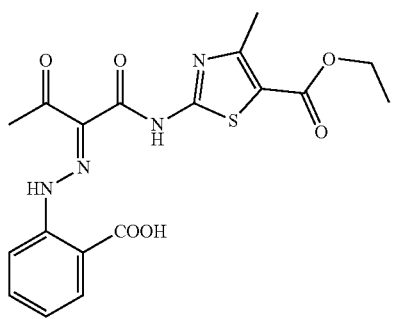
3
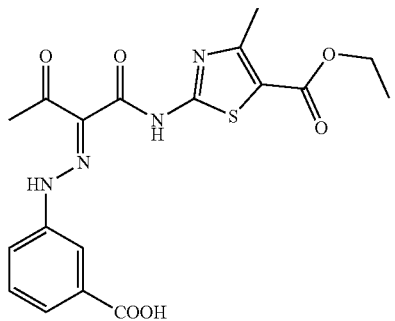
4
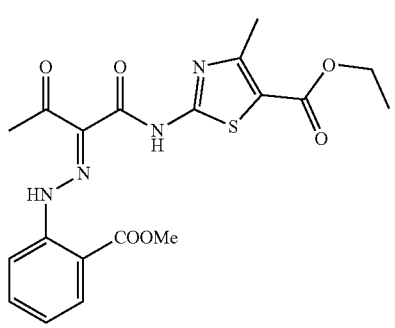
5
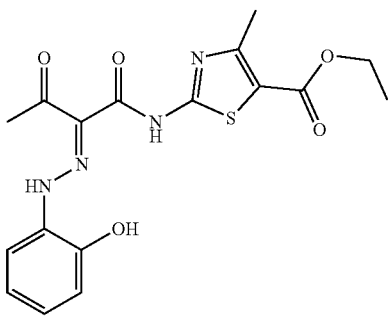
6
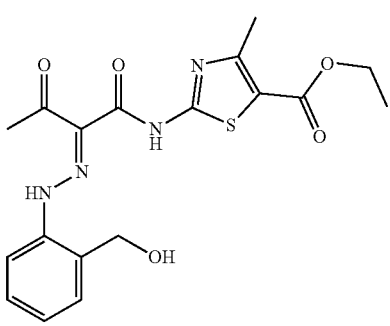
7
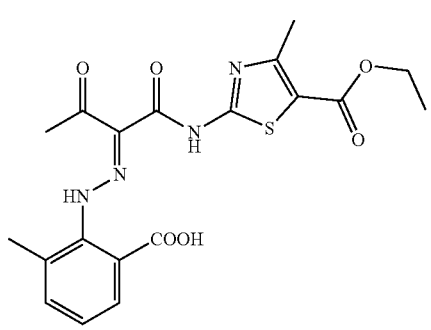
8
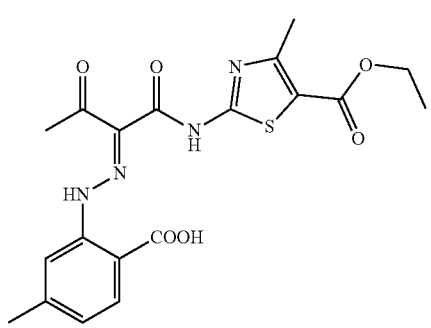
9
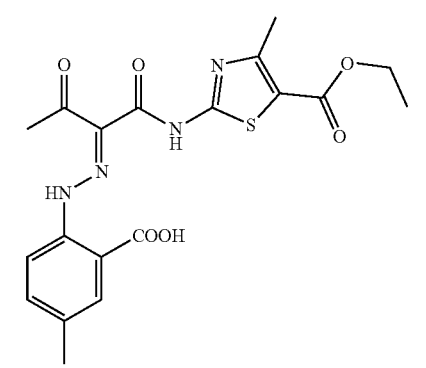

10
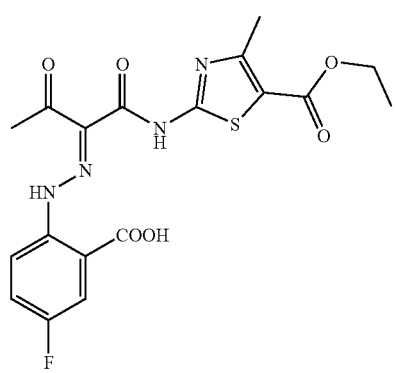
11
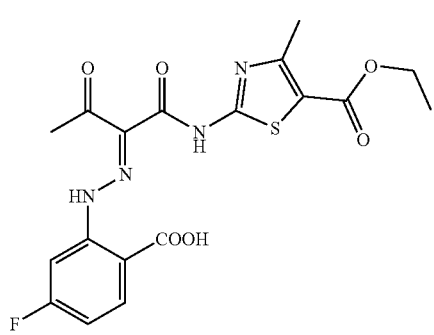
12
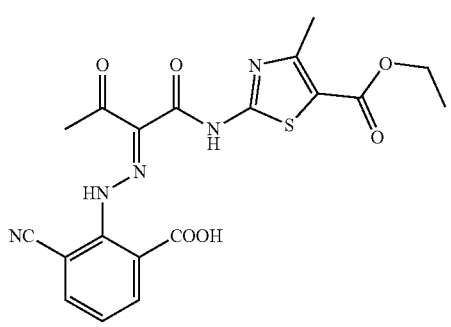
13
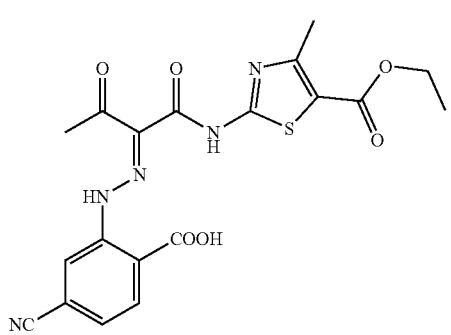
14
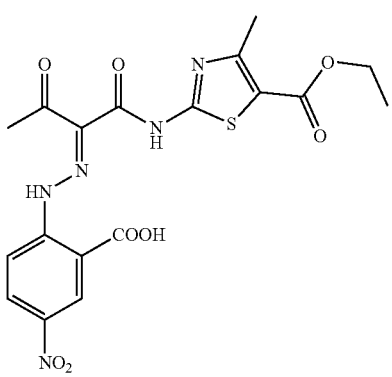
15
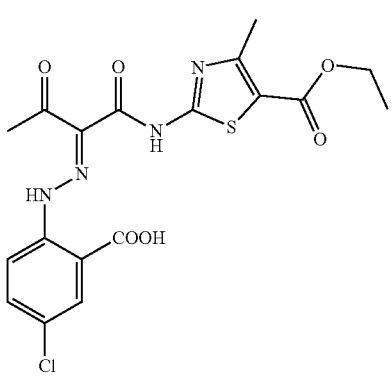
16
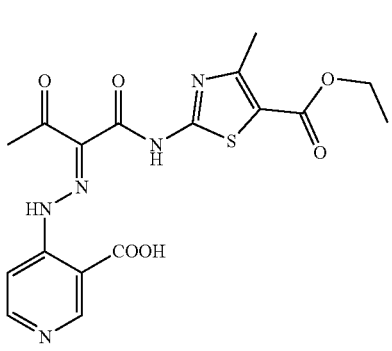
17
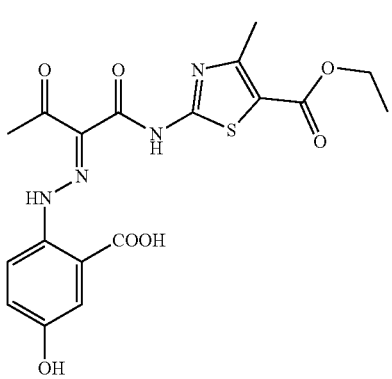

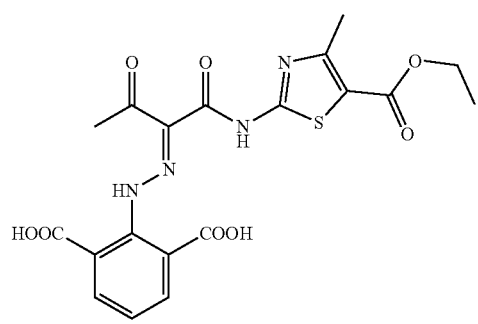
18
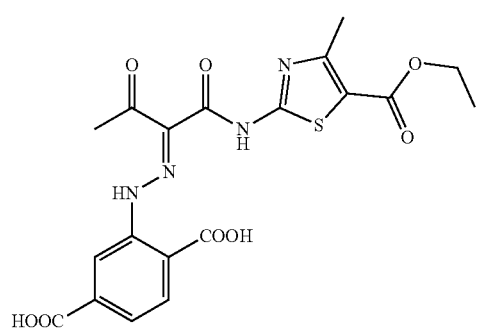
19
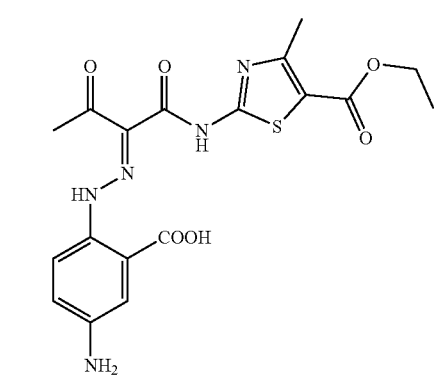
20
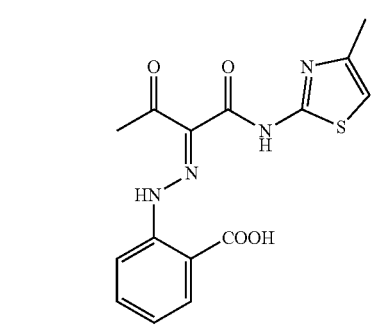
21
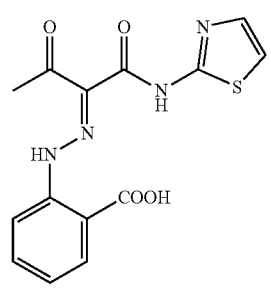
22
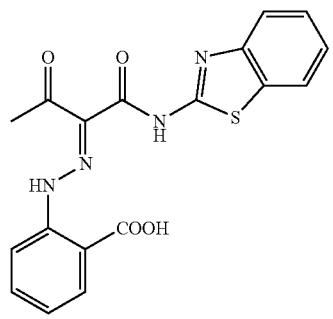
23
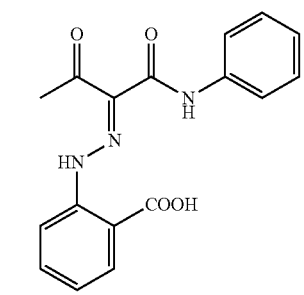
24
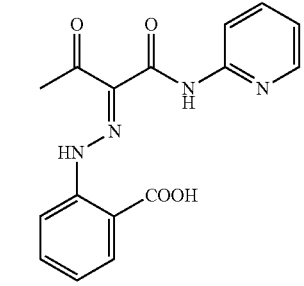
25
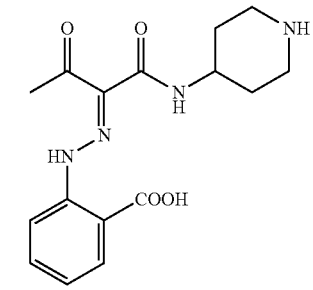
26
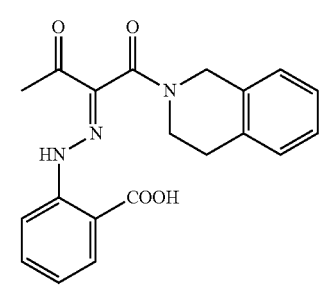
27

28
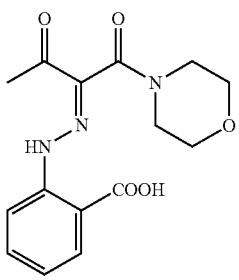
29
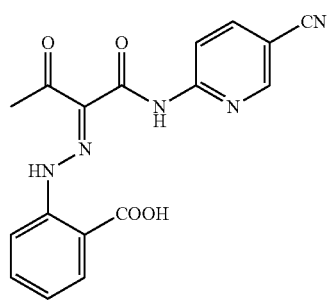
30
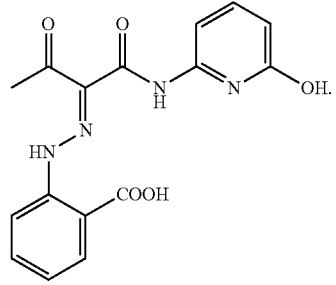
4. The method according to claim 3, wherein the pharmaceutical composition further comprises a pharmaceutically acceptable carrier, an excipient, a diluent, an adjuvant, a vehicle or any combination thereof.
* * * * *